(12) United States Patent
Kim et al.

(10) Patent No.: US 10,126,943 B2
(45) Date of Patent: Nov. 13, 2018

(54) MOBILE TERMINAL FOR ACTIVATING EDITING FUNCTION WHEN ITEM ON FRONT SURFACE DISPLAY AREA IS DRAGGED TOWARD SIDE SURFACE DISPLAY AREA

(71) Applicant: LG ELECTRONICS INC., Seoul (KR)

(72) Inventors: Jongpil Kim, Seoul (KR); Anna Yoo, Seoul (KR); Kyunghee Yoo, Seoul (KR); Seungmin Seen, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 14/759,722

(22) PCT Filed: Jul. 10, 2014

(86) PCT No.: PCT/KR2014/006221
§ 371 (c)(1),
(2) Date: Jul. 8, 2015

(87) PCT Pub. No.: WO2015/194694
PCT Pub. Date: Dec. 23, 2015

(65) Prior Publication Data
US 2016/0266774 A1    Sep. 15, 2016

(30) Foreign Application Priority Data

Jun. 17, 2014    (KR) ........................ 10-2014-0073813

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 1/1626* (2013.01); *G06F 1/1643* (2013.01);
(Continued)

(58) Field of Classification Search
CPC ................. G06T 2200/24; G06T 11/60; G06T 2219/2021; G06T 3/40; G06T 2210/22;
(Continued)

(56) References Cited

U.S. PATENT DOCUMENTS

| 8,365,084 B1 * | 1/2013 | Lin | ........................ G06F 3/0481 |
| | | | 715/728 |
| 8,381,123 B2 * | 2/2013 | Karas | ...................... G06F 3/0485 |
| | | | 715/786 |

(Continued)

FOREIGN PATENT DOCUMENTS

| EP | 2180400 A2 | 4/2010 |
| EP | 2458489 A2 | 5/2012 |
| KR | 10-2013-0064478 A | 6/2013 |

*Primary Examiner* — Ajay M Bhatia
*Assistant Examiner* — Jennifer E Nichols
(74) *Attorney, Agent, or Firm* — Birch, Stewart, Kolasch & Birch, LLP

(57) ABSTRACT

A mobile terminal according to the present invention can provide various user interfaces for editing an image itself displayed on a front surface display area, an editing function for items displayed on the front surface display area, and so on by using the front surface display area and a side surface display area.

8 Claims, 28 Drawing Sheets

(51) Int. Cl.
| | | |
|---|---|---|
| G06F 3/0484 | (2013.01) | |
| G06F 3/0481 | (2013.01) | |
| G06F 3/0482 | (2013.01) | |
| G06T 3/40 | (2006.01) | |
| G06F 1/16 | (2006.01) | |
| G06F 3/0486 | (2013.01) | |
| G06T 11/60 | (2006.01) | |

(52) U.S. Cl.
CPC .......... *G06F 3/0482* (2013.01); *G06F 3/0486* (2013.01); *G06F 3/0488* (2013.01); *G06F 3/04817* (2013.01); *G06F 3/04842* (2013.01); *G06F 3/04845* (2013.01); *G06F 3/04883* (2013.01); *G06T 3/40* (2013.01); *G06F 2203/04803* (2013.01); *G06T 11/60* (2013.01); *G06T 2200/24* (2013.01); *G06T 2210/22* (2013.01); *G06T 2219/2021* (2013.01)

(58) Field of Classification Search
CPC ............. G06F 3/04886; G06F 3/04845; G06F 3/04817; G06F 3/0482; G06F 3/04883; G06F 3/0488; G06F 3/04842
See application file for complete search history.

(56) References Cited

U.S. PATENT DOCUMENTS

| | | | | |
|---|---|---|---|---|
| 8,423,911 | B2* | 4/2013 | Chaudhri | G06F 3/04817 715/835 |
| 8,627,192 | B2* | 1/2014 | Lanahan | G06T 11/60 715/204 |
| 9,250,793 | B2* | 2/2016 | Tamberg | G06F 9/4451 |
| 9,921,714 | B1* | 3/2018 | Shapiro | G06F 3/04817 |
| 2005/0166159 | A1* | 7/2005 | Mondry | G06F 3/0486 715/769 |
| 2007/0133074 | A1* | 6/2007 | Fabrice | G06T 11/60 358/537 |
| 2007/0162844 | A1* | 7/2007 | Woodall | G06F 17/212 715/209 |
| 2007/0222769 | A1* | 9/2007 | Otsuka | G01C 21/265 345/173 |
| 2008/0034317 | A1* | 2/2008 | Fard | G06F 3/0481 715/781 |
| 2009/0093276 | A1* | 4/2009 | Kim | G06F 3/0482 455/566 |
| 2010/0058216 | A1* | 3/2010 | Yoon | G06F 3/0482 715/769 |
| 2010/0081475 | A1* | 4/2010 | Chiang | G06F 3/0483 455/564 |
| 2010/0095248 | A1* | 4/2010 | Karstens | G06F 3/048 715/846 |
| 2010/0162153 | A1* | 6/2010 | Lau | G06F 3/0488 715/769 |
| 2010/0199227 | A1* | 8/2010 | Xiao | G06F 3/0481 715/863 |
| 2010/0223568 | A1* | 9/2010 | Quek | G06T 11/60 715/765 |
| 2010/0295789 | A1* | 11/2010 | Shin | G06F 1/1626 345/168 |
| 2011/0072344 | A1* | 3/2011 | Harris | G06F 3/04817 715/702 |
| 2011/0087981 | A1* | 4/2011 | Jeong | G06F 3/04817 715/765 |
| 2011/0312387 | A1* | 12/2011 | Heo | G06F 3/0481 455/566 |
| 2012/0075676 | A1* | 3/2012 | Komoto | G06T 11/206 358/1.18 |
| 2012/0127109 | A1* | 5/2012 | Nishio | G06F 3/04883 345/173 |
| 2012/0169768 | A1* | 7/2012 | Roth | G06F 3/0485 345/629 |
| 2012/0176322 | A1* | 7/2012 | Karmi | G06F 3/04883 345/173 |
| 2012/0176403 | A1* | 7/2012 | Cha | G06F 1/1694 345/619 |
| 2012/0206771 | A1* | 8/2012 | Cok | G06T 11/60 358/1.18 |
| 2012/0304084 | A1* | 11/2012 | Kim | G06F 3/0486 715/762 |
| 2012/0311472 | A1* | 12/2012 | Kim | G06F 3/0482 715/765 |
| 2012/0320081 | A1* | 12/2012 | Kim | G06F 9/44505 345/619 |
| 2013/0050109 | A1* | 2/2013 | Ban | G06F 3/04883 345/173 |
| 2013/0076649 | A1 | 3/2013 | Myers et al. | |
| 2013/0117698 | A1* | 5/2013 | Park | G06F 3/04817 715/765 |
| 2013/0135234 | A1* | 5/2013 | Hisano | G06F 3/017 345/173 |
| 2013/0147849 | A1* | 6/2013 | Kwak | G09G 5/14 345/666 |
| 2013/0159902 | A1 | 6/2013 | Kwak et al. | |
| 2013/0179816 | A1* | 7/2013 | Seo | G06F 3/04842 715/770 |
| 2013/0249837 | A1* | 9/2013 | Liu | G06F 3/04883 345/173 |
| 2013/0249841 | A1* | 9/2013 | Yang | G06F 3/0486 345/173 |
| 2013/0268895 | A1* | 10/2013 | Yamaki | G06F 3/04817 715/835 |
| 2013/0300697 | A1* | 11/2013 | Kim | G06F 1/1626 345/173 |
| 2013/0321340 | A1* | 12/2013 | Seo | G06F 1/1641 345/174 |
| 2013/0342483 | A1 | 12/2013 | Seo et al. | |
| 2014/0013271 | A1* | 1/2014 | Moore | G06F 3/0482 715/792 |
| 2014/0040756 | A1* | 2/2014 | Bukurak | G06F 3/017 715/741 |
| 2014/0053097 | A1* | 2/2014 | Shin | G06F 9/4443 715/779 |
| 2014/0059461 | A1* | 2/2014 | Kim | G06T 5/50 715/769 |
| 2014/0089831 | A1* | 3/2014 | Kim | G06F 3/0481 715/769 |
| 2014/0089833 | A1* | 3/2014 | Hwang | G06F 3/04817 715/769 |
| 2014/0101575 | A1* | 4/2014 | Kwak | G06F 1/1616 715/761 |
| 2014/0267063 | A1* | 9/2014 | Tijssen | G06F 3/041 345/173 |
| 2014/0351722 | A1* | 11/2014 | Frederickson | G06F 3/0481 715/761 |
| 2015/0015511 | A1* | 1/2015 | Kwak | G06F 3/0412 345/173 |
| 2015/0025718 | A1* | 1/2015 | Miichi | G09B 29/007 701/21 |
| 2015/0113457 | A1* | 4/2015 | Li | G06F 3/0488 715/765 |
| 2015/0169535 | A1* | 6/2015 | Pusateri | G06F 17/248 715/202 |
| 2015/0370317 | A1* | 12/2015 | Cha | G06F 3/002 345/676 |
| 2016/0139748 | A1* | 5/2016 | Iwaizumi | G06F 3/0488 715/769 |
| 2017/0185290 | A1* | 6/2017 | Lim | G06F 3/04886 |
| 2018/0039382 | A1* | 2/2018 | Jeong | G06F 3/0488 |

* cited by examiner (a)

(b)

(a) Re-edition                (b) Storage of an edited image (a) A new image combining seven images (b) A new image combining three images

MOBILE TERMINAL FOR ACTIVATING EDITING FUNCTION WHEN ITEM ON FRONT SURFACE DISPLAY AREA IS DRAGGED TOWARD SIDE SURFACE DISPLAY AREA

CROSS-REFERENCE TO RELATED APPLICATIONS

This application is the National Phase of PCT International Application No. PCT/KR2014/006221, filed on Jul. 10, 2014, which claims priority under 35 U.S.C. 119(a) to Patent Application No. 10-2014-0073813, filed in the Republic of Korea on Jun. 17, 2014, all of which are hereby expressly incorporated by reference into the present application.

BACKGROUND OF THE DISCLOSURE

1. Field of the Disclosure

The present invention is related to a mobile terminal capable of providing various user interfaces by using a front surface display area and a side surface display area.

2. Background of the Disclosure

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

SUMMARY OF THE DISCLOSURE

Accordingly, an object of the present invention is to address the above-noted and other problems.

Another object of the present invention is to provide a mobile terminal capable of providing various user interfaces by using not only a front surface display area which plays the role of main display but also a side surface display area.

A mobile terminal according to one aspect of the present invention to achieve the another object comprises a display unit embedding a touch screen function and including a front surface display area and a side surface display area; and a controller activating an editing function for an image displayed on the front surface display area in case the image is dragged beyond the front surface display area along a direction to the side surface display area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
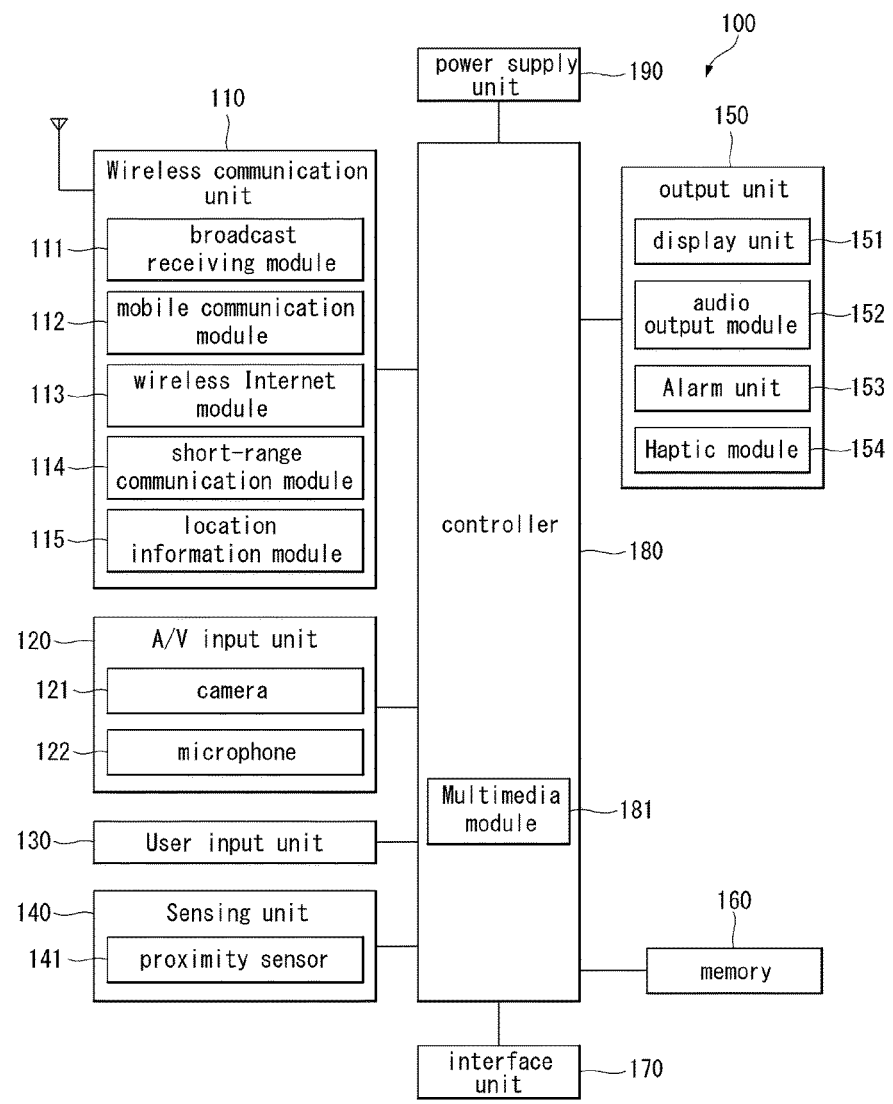
FIG. 1 is a block diagram of a mobile terminal in accordance with the present disclosure.
Figure 2:
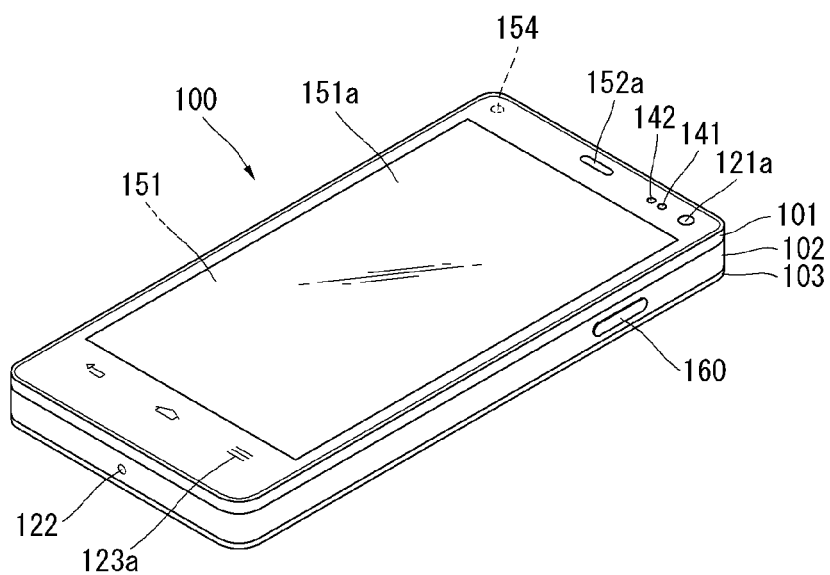
FIGS. 2 and 3 are conceptual views of one example of the mobile terminal, viewed from different directions.
Figure 3:
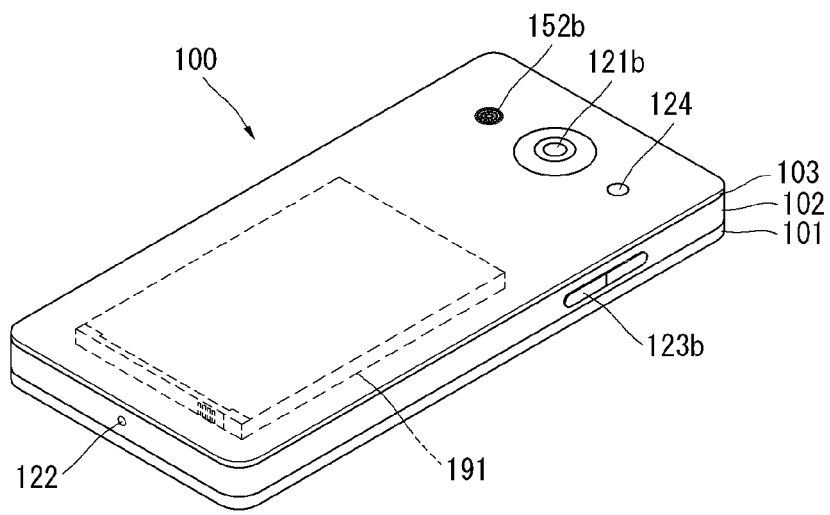

Reference is now made to FIGS. 1-3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal. communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject.

As shown in FIG. 2, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 4:
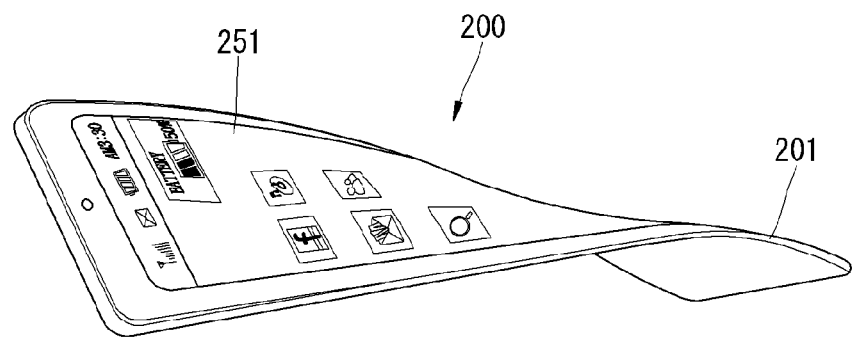
FIG. 4 is a conceptual view of a deformable mobile terminal according to an alternative embodiment of the present disclosure.

FIG. 4 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1-3.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 5:
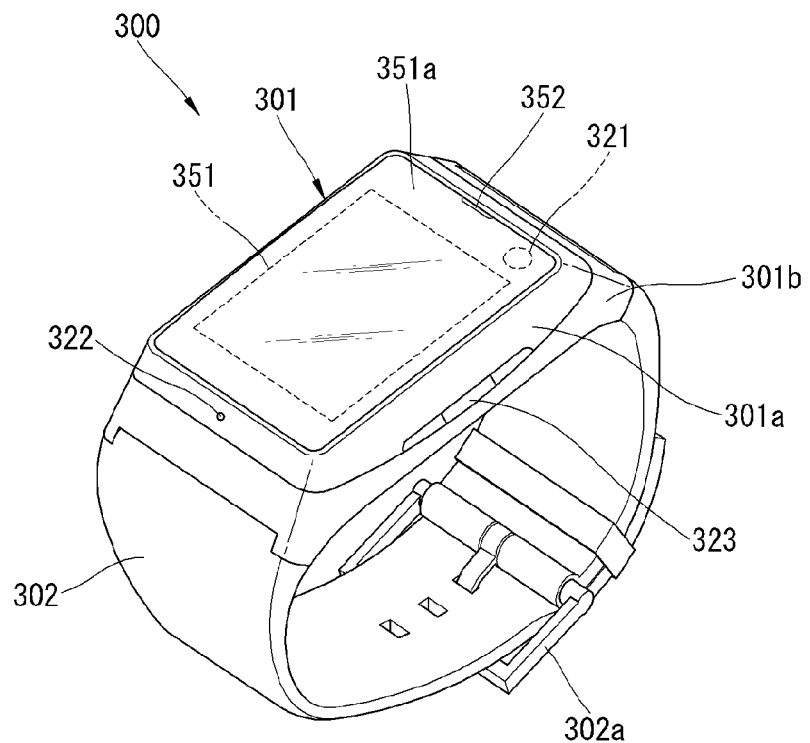
FIG. 5 is a conceptual view of a wearable mobile terminal according to another alternative embodiment of the present disclosure.

FIG. 5 is a perspective view illustrating one example of a watch-type mobile terminal 300 in accordance with another exemplary embodiment. As illustrated in FIG. 5, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1-3.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Figure 6:
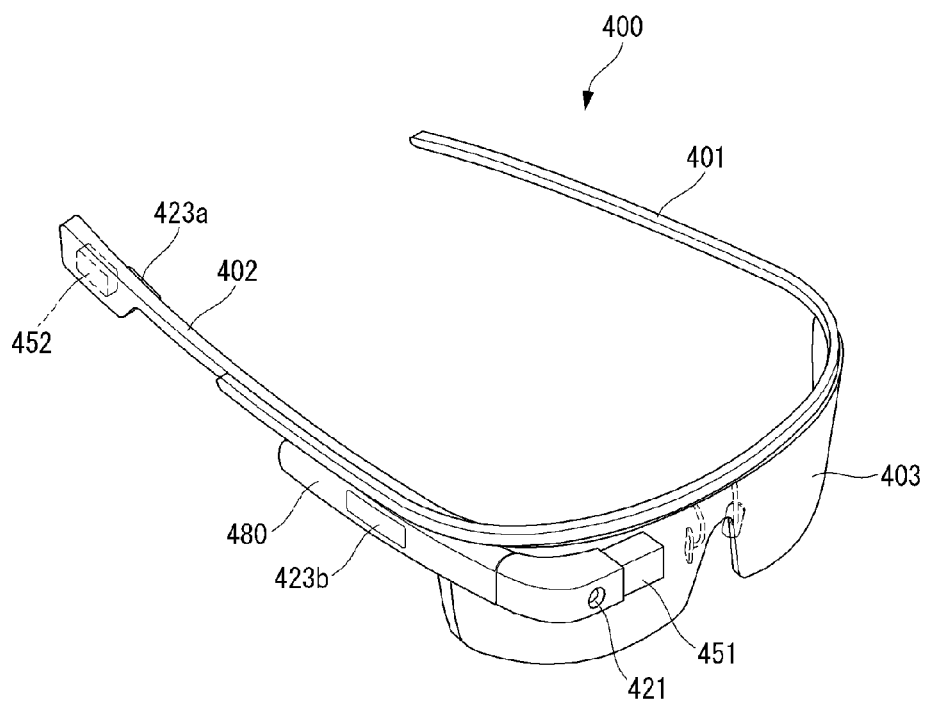
FIG. 6 is a conceptual view of a wearable mobile terminal according to another alternative embodiment of the present disclosure.

FIG. 6 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1-3.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 6 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 6 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Further preferred embodiments will be described in more detail with reference to additional drawing figures. It is understood by those skilled in the art that the present features can be embodied in several forms without departing from the characteristics thereof.

For the convenience of descriptions, the present invention assumes that the display unit 151 employs a touch screen 151. The touch screen 151 can carry out an information display function and an information input function simultaneously.

Figure 7:
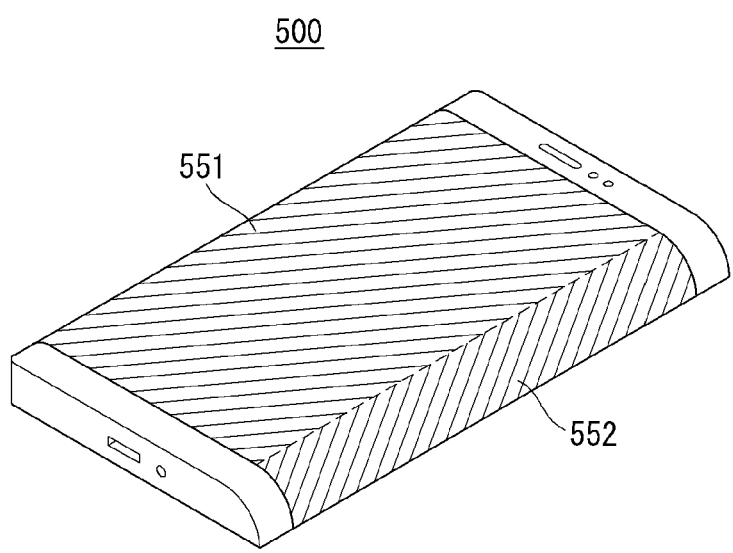
FIG. 7 illustrates one example of a mobile terminal according to the present invention comprising a front surface display area and a side surface display area.

FIG. 7 illustrates one example of a mobile terminal 500 according to the present invention comprising a front surface display area 551 and a side surface display area 552.

The side surface display area 552 can be realized by extending the front surface display area 551. Meanwhile, while the front surface display area 551 is flat, the side surface display area 552 can be a round type.

The two display areas of FIG. 7 are distinguished from each other by a dotted line, which indicates that the two actual display areas may or may not be physically separated from each other. In other words, the two display areas can be realized as a physically connected, single display area, and the dotted line is just intended to indicate that the two display areas can be utilized being functionally separated from each other. This assumption can be applied in the same way for other examples to be examined later.

The front surface display area 551 can carry out the role of main display of the mobile terminal 500, while the side surface display area 552 the role of auxiliary display. And this assumption is also applied for other embodiments to be examined later.

For example, the front surface display area 551 can display a background screen, while the side surface display area 552 can display an indicator area. The indicator area may display current time, a communication status of at least one communication module, and a battery gauge reading.

In another example, the front display area 551 can display an execution screen of an application under execution, while the side surface display area 552 can display a graphic user interface for carrying out a function related to the application under execution.

Figure 8:
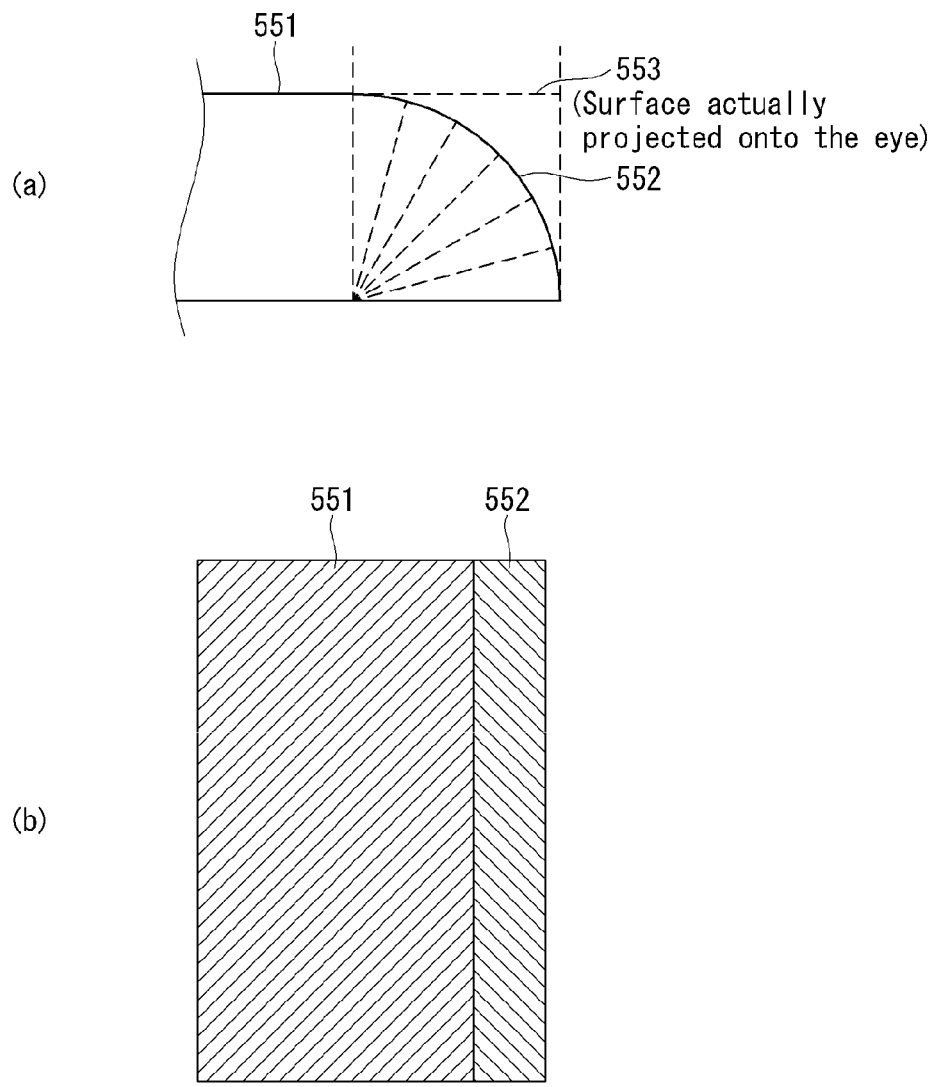
FIG. 8 illustrates a display method of a mobile terminal of FIG. 7.

FIG. 8 illustrates a display method of a mobile terminal of FIG. 7.

FIG. 8(*a*) shows part of cross section of the mobile terminal 500. As FIG. 8(*a*) shows, the display surface of the front surface display area 551 is flat, but the display surface of the side surface display area 552 is rounded. Because of the structure, a distortion is observed in an image displayed on the side surface display area 552. The controller 180 of the mobile terminal 500 compensates the image distortion. In other words, the controller 180 processes image data corresponding to the side surface display area 552 so that the image data look in a normal manner on the surface actually projected on the eye.

FIG. 8(*b*) illustrates conceptual disposition of display areas as seen from the front of the mobile terminal 500. Referring to FIG. 8(*b*), the user can see that the side surface display area 552 is disposed in the right side of the front surface display area 551 and the two areas are utilized to display image data.

Figure 9:
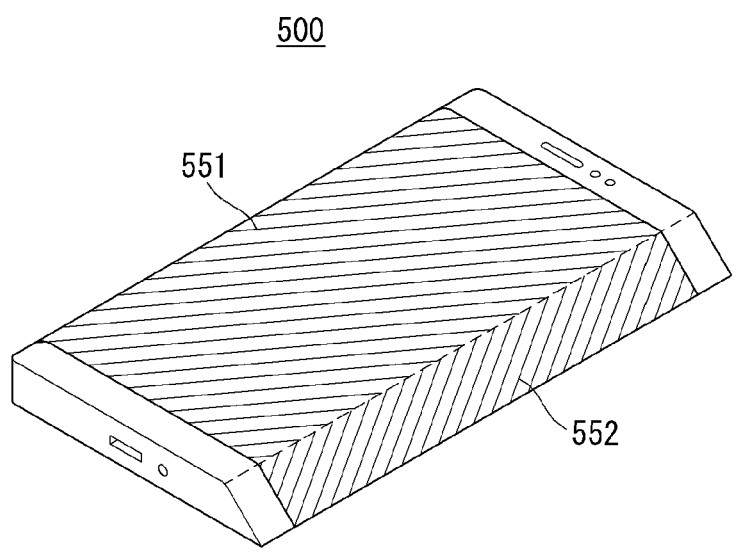
FIG. 9 illustrates another example of a mobile terminal according to the present invention comprising a front surface display area and a side surface display area.

FIG. 9 illustrates another example of a mobile terminal 500 according to the present invention comprising a front surface display area 551 and a side surface display area 552.

The side surface display area 552 can be realized as an extension of the front surface display area 551. Meanwhile, differently from the example of FIG. 7, the display surface of the side surface display area 552 can be a flat surface forming a slope against the front surface display area 551.

Figure 10:
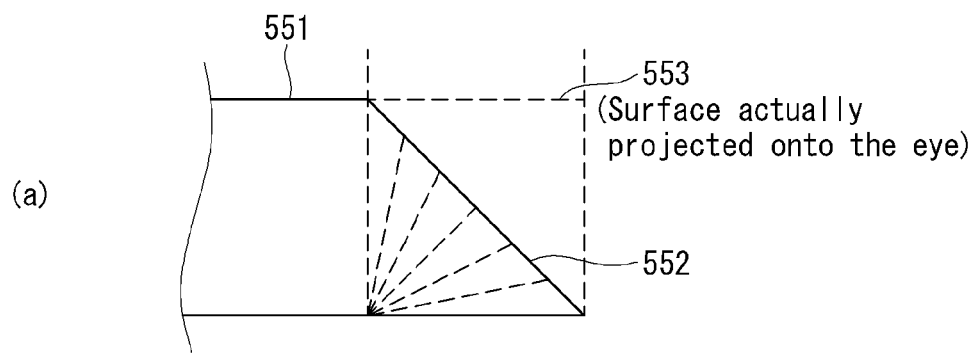
FIG. 10 illustrates a display method for a mobile terminal of FIG. 9.
Figure 10:
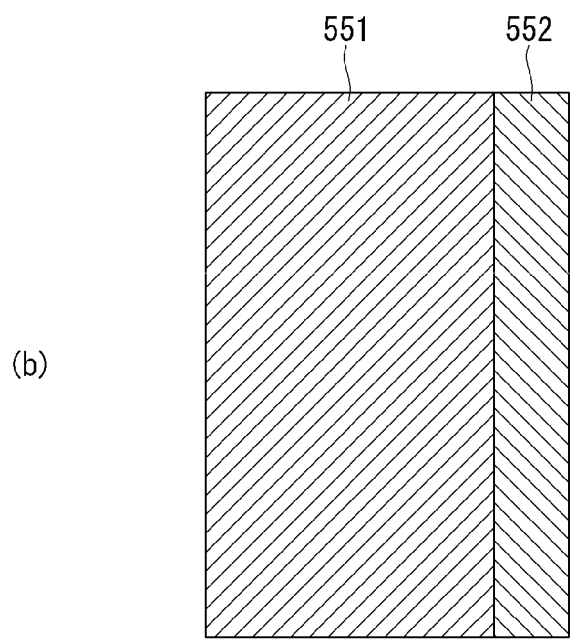

FIG. 10 illustrates a display method for a mobile terminal 500 of FIG. 9.

FIG. 10(*a*) shows part of cross section of the mobile terminal 500. With reference to FIG. 10(*a*), the display surface of the side surface display area 552 can be a flat surface forming a slope with respect to the display surface of the front surface display area 551 in a downward direction. Because of this structure, an image displayed on the side surface display area 552 is distorted. By compensating the image distortion, the image on the surface 553 actually projected onto the eye can be made to look undistorted.

FIG. 10(*b*) illustrates conceptual disposition of display areas as seen from the front of the mobile terminal 500. Referring to FIG. 10(*b*), it can be seen that the side surface display area 552 is disposed in the right side of the front surface display area 551 and the two areas are utilized to display image data.

Figure 11:
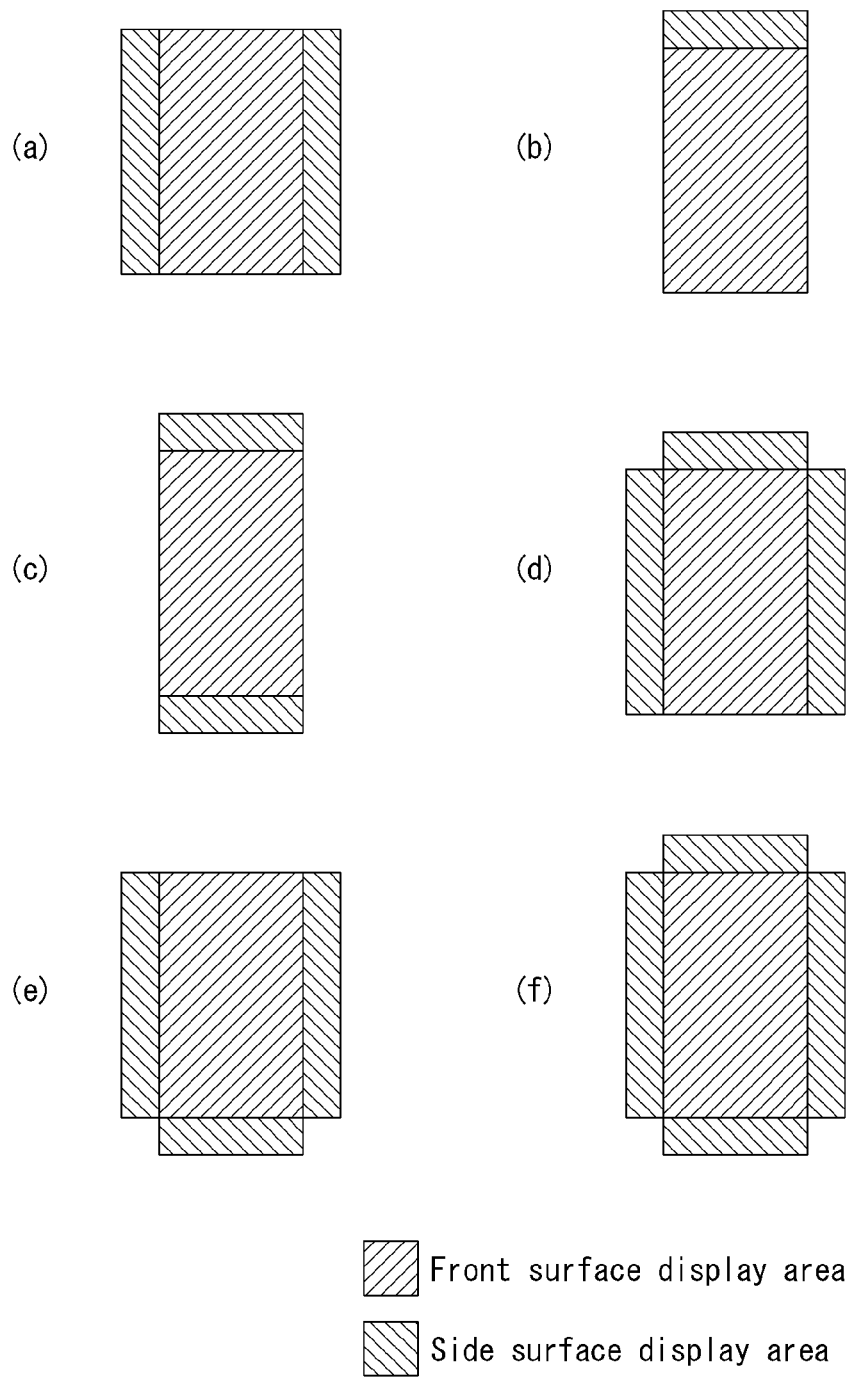
FIG. 11 illustrates examples of combinations of a front surface display area and side surface display areas which can be implemented in a mobile terminal according to the present invention.

FIG. 11 illustrates examples of combinations of a front surface display area and side surface display areas which can be implemented in a mobile terminal according to the present invention. It should be noted that the examples of combinations only considers conceptual disposition of display areas as seen from the front of the mobile terminal.

With reference to FIG. 11(*a*), a mobile terminal according to the present invention can include two rectangle-shaped, side surface display areas disposed in the left and right side of a rectangle-shaped front display area. Meanwhile, it should be noted that the front surface display area and the side surface display areas are not limited to a rectangular shape. This assumption about the shape will be applied in the same way to other examples to follow.

As described above, the display surface of the side surface display area can be curved or flat. And the display surface of the side surface display area can form a slope with respect to the display surface of the front display. This assumption can be applied in the same way to other examples to be examined later.

With reference to FIG. 11(*b*), a mobile terminal according to the present invention can include a side surface display area disposed in the upper part of the front surface display area. With reference to FIG. 11(*c*), a mobile terminal according to the present invention can include two side surface display areas disposed separately in the upper and lower part of the front surface display area.

With reference to FIG. 11(*d*), a mobile terminal according to the present invention can include three side surface display areas disposed in both sides and in the upper part of the front surface display area. With reference to FIG. 11(*e*), a mobile terminal according to the present invention can include three side surface display areas disposed in both sides and in the lower part of the front surface display area. With reference to FIG. 11(*f*), a mobile terminal according to the present invention can include four side surface display areas disposed in both sides and in the upper and lower part of the front surface display area.

Figure 12:
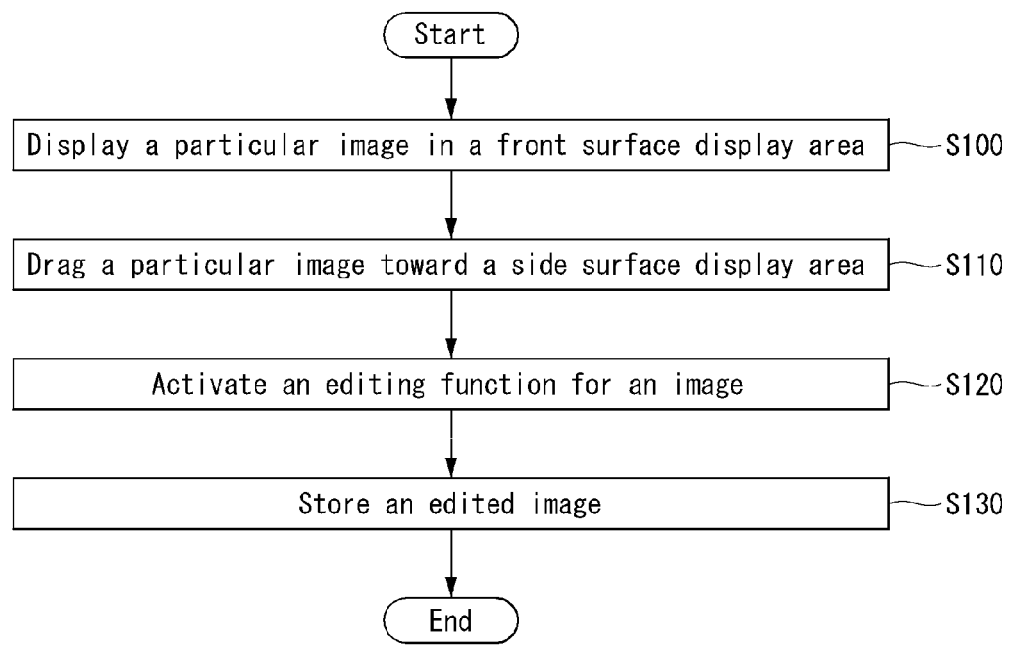
FIG. 12 is a flow diagram illustrating one example of a method for operating a mobile terminal according to the present invention.

FIG. 12 is a flow diagram illustrating one example of a method for operating a mobile terminal according to the present invention. In what follows, the method for operating a mobile terminal will be described with reference to related drawings.

A particular image is displayed on the front surface display area S100. The particular image may be a result from processing a particular image file or an image capture of a displayed screen of the front surface display area according to the user's operation. And the particular image may correspond to one of multiple images displayed on the front surface display area.

While the particular image is displayed on the front surface display area, a dragging motion with respect to the particular image along a direction to the side surface display area is received S110. In case the particular image is the only object displayed on the front surface display area, a dragging touch input at an arbitrary position of the front surface display area toward the side surface display area corresponds to dragging of the particular image toward the side surface display area. And if the particular image corresponds to one of multiple images displayed on the front surface display area, a dragging touch input received through the particular image toward the side surface display area can correspond to dragging of the particular image toward the side surface display area.

If a dragging motion toward the side surface display area with respect to the particular image is received, the controller 180 activates an editing function for the particular image S120. Meanwhile, the controller 180 can activate an editing function for the particular image only when the particular image is dragged moving beyond the front surface display area toward the side surface display area.

The editing function for the particular image includes deletion of at least part of an image, cutting off at least part of an image, change of color for at least part of an image, image rotation, and duplication of at least part of an image. However, the technical scope of the present invention is not limited to the above example.

After editing of the particular image based on the activated image editing function is completed, the controller 180 stores the edited image into the memory 170 according to the user's operation or in case a predetermined condition is met S130. At this time, the user's operation includes manipulation of an item included in the graphic user interface provided for carrying out the editing function and a hardware button operation mapped beforehand to a storage function for an edited image. And the predetermined condition may include the case the editing function is not carried out for more than a predetermined time period.

Figure 13:
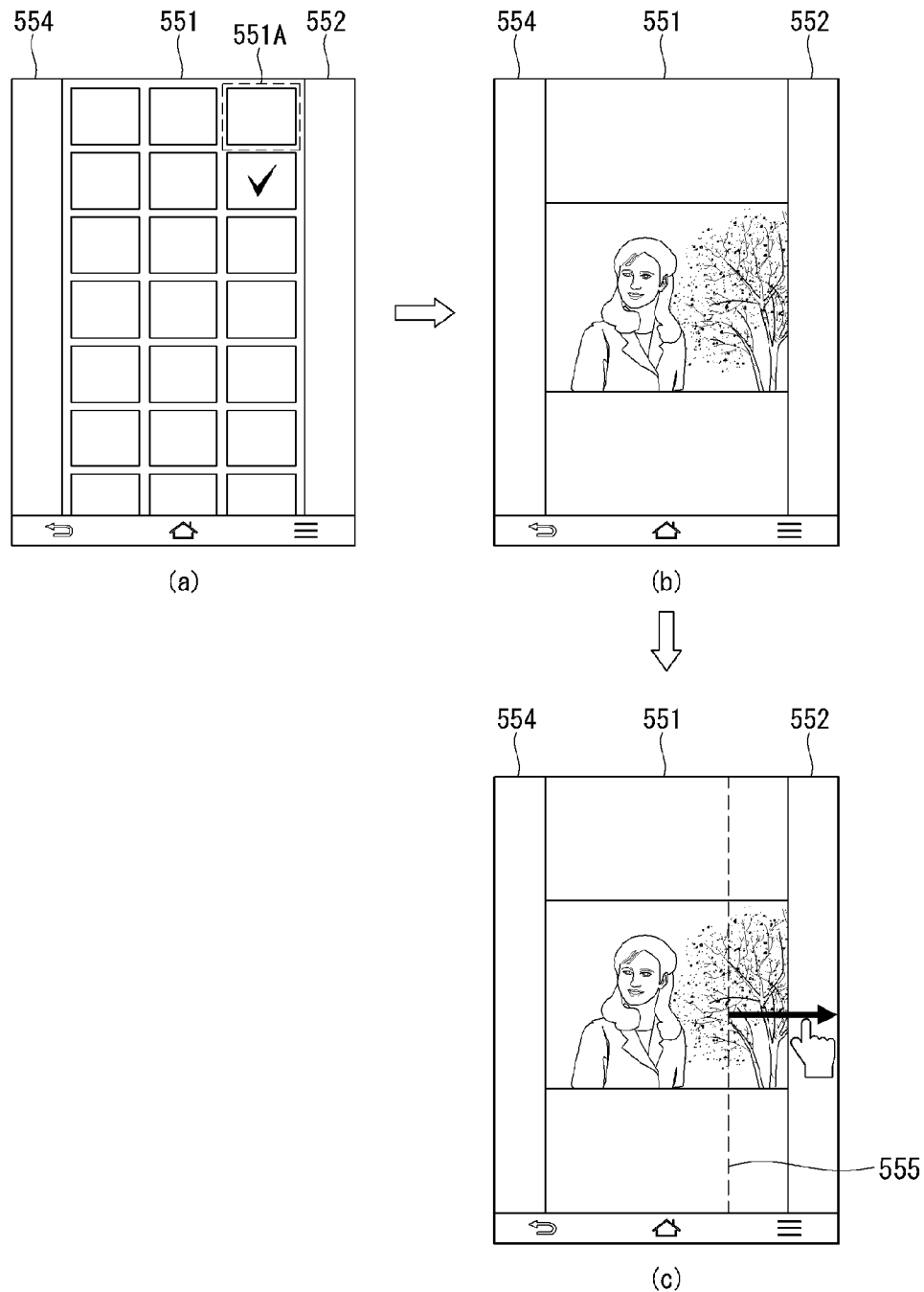
FIGS. 13 to 15 illustrate examples of carrying out an editing function for an image displayed on a front surface display area according to the method of operating a mobile terminal of FIG. 12.
Figure 14:
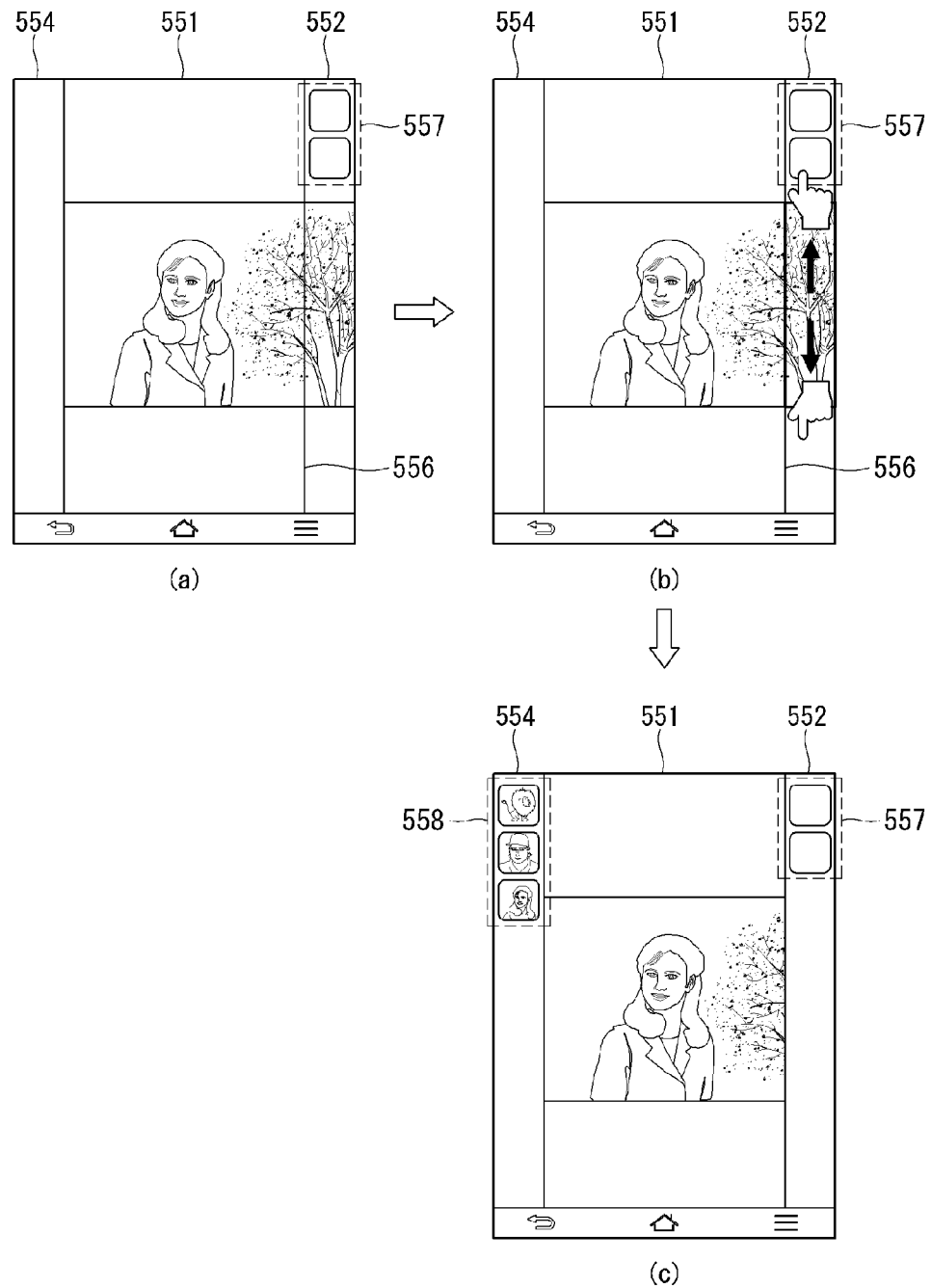
Figure 15:
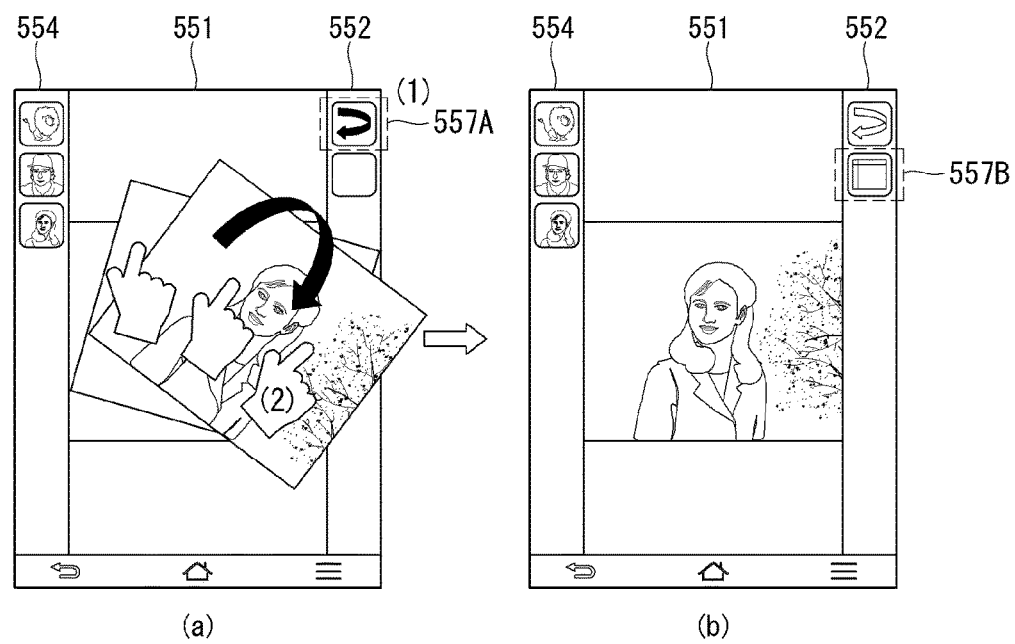

FIGS. 13 to 15 illustrate examples of carrying out an editing function for an image displayed on a front surface display area according to the method of operating a mobile terminal of FIG. 12. In the examples of FIGS. 13 to 15, it is assumed that the display unit 151 includes the front surface display area 551 and side surface display areas 552 and 554 disposed in the left and right side of the front surface display area 551.

FIG. 13(*a*) illustrates a case where thumbnails 551A corresponding to a plurality of image files are displayed on the front surface display area 551. For example, the screen may correspond to an execution screen of an image view application. The 'V' mark indicates an thumbnail image corresponding to a particular image filed from among the plurality of thumbnails 551A. Selection of the particular image can be carried out based on a simple touch input of the user.

If a thumbnail image corresponding to the particular image is selected under a condition of FIG. 13(a), the controller 180 displays an execution screen of the particular image file on the front surface display area 551 as shown in FIG. 13(b). FIG. 13(c) illustrates a case where dragging of the particular image toward the side surface display area 552 is carried out while the particular image is being displayed on the front surface display area 551. A guideline 555 is also displayed.

And FIG. 14(a) illustrates a case where the particular image is dragged beyond the side surface display area 552. Then the controller 180 activates an editing function with respect to the particular image. According to the implementation of the present invention, the controller 180 can activate an editing function for the particular image in case a dragging motion on the particular image is maintained for a predetermined time period. For example, in case a touch input for selecting the particular image is dragged toward the side surface display area 552 and the touch input is maintained for a predetermined time period (for example, 1 second), the controller 180 can activate an editing function for the particular image.

Once an editing function for the particular image is activated, the controller 180, as shown in FIG. 14(a), can display a graphic user interface 557 for carrying out an editing function for the particular image on the side surface display area 552 and display part of the particular image dragged beyond the front surface display area 551 on the side surface display area 552.

The graphic user interface can include icons representing a function for deleting or cutting off the part of the particular image which has crossed to the side surface display area, a rotation function for the particular image, an edit undo function for the particular image, and a storage function for an edited image. However, the technical scope of the present invention is not limited to the above example.

Meanwhile, the controller 180 may display a graphic user interface 558 for carrying out an editing function with respect to the particular image on another side surface display area 554 disposed in the left side of the front surface display area 551.

Also, the controller can display guidelines 556 by which to check how much a particular image has been dragged into the side surface display area 552 from the front surface display area 551 on the boundaries 551, 552 of the two display areas.

FIG. 14(b) illustrates a case where an operation for carrying out a function for deleting part of the particular image which has crossed into the side surface display area 552. More specifically, FIG. 14(b) illustrates a case where the user performs a touch motion rubbing up and down the side surface display area 552 and deletes the part of the particular image which has been dragged into the side surface display area 552. Meanwhile, a deleted part of the particular image can be stored separately in the memory 170. This scheme can be similar to a cutting function for an image file or text.

Meanwhile, according to another embodiment of the present invention, the controller 180 may delete the part of the particular image dragged into the side surface display area 552 by selecting a deletion icon included in a graphic user interface provided through the side surface display area 552.

And according to a yet another embodiment of the present invention, the controller 180 may carry out an automatic delete function for the part of the particular image dragged into the side surface display area 552. Meanwhile, in case the particular image is dragged into the side surface display area 554 in the opposite direction, the controller 180 may automatically delete left part of the particular image dragged into the side surface display area 554.

Meanwhile, FIG. 14(c) illustrates a case where thumbnail images representing editing results with respect to the particular image are displayed on another side surface display area 554 disposed in the opposite direction of the side surface display area 552. According to another embodiment of the present invention, the another side surface display area 554 may provide a graphic user interface corresponding to an editing process with respect to the particular image or a graphic user interface for carrying out an editing function with respect to the particular image.

FIG. 15(a) illustrates a case where the user selects an icon corresponding an image rotation function included in a graphic user interface for carrying out an image editing function displayed on the side surface display area 552 and rotates a particular image through an touch motion on the particular image displayed on the front surface display area 551. After rotating the particular image, the user can carry out a deleting function for an upper part of the particular image by dragging the rotated image into the side surface display area 552. Through the process, the deleting function may be carried out for a left side area or a lower part of the particular image.

FIG. 15(b) illustrates a case where the user selects an icon corresponding to an edit image storing function included in a graphic user interface for carrying out an image edit function displayed on the side surface display area 552 and stores an editing result with respect to a particular image.

Figure 16:
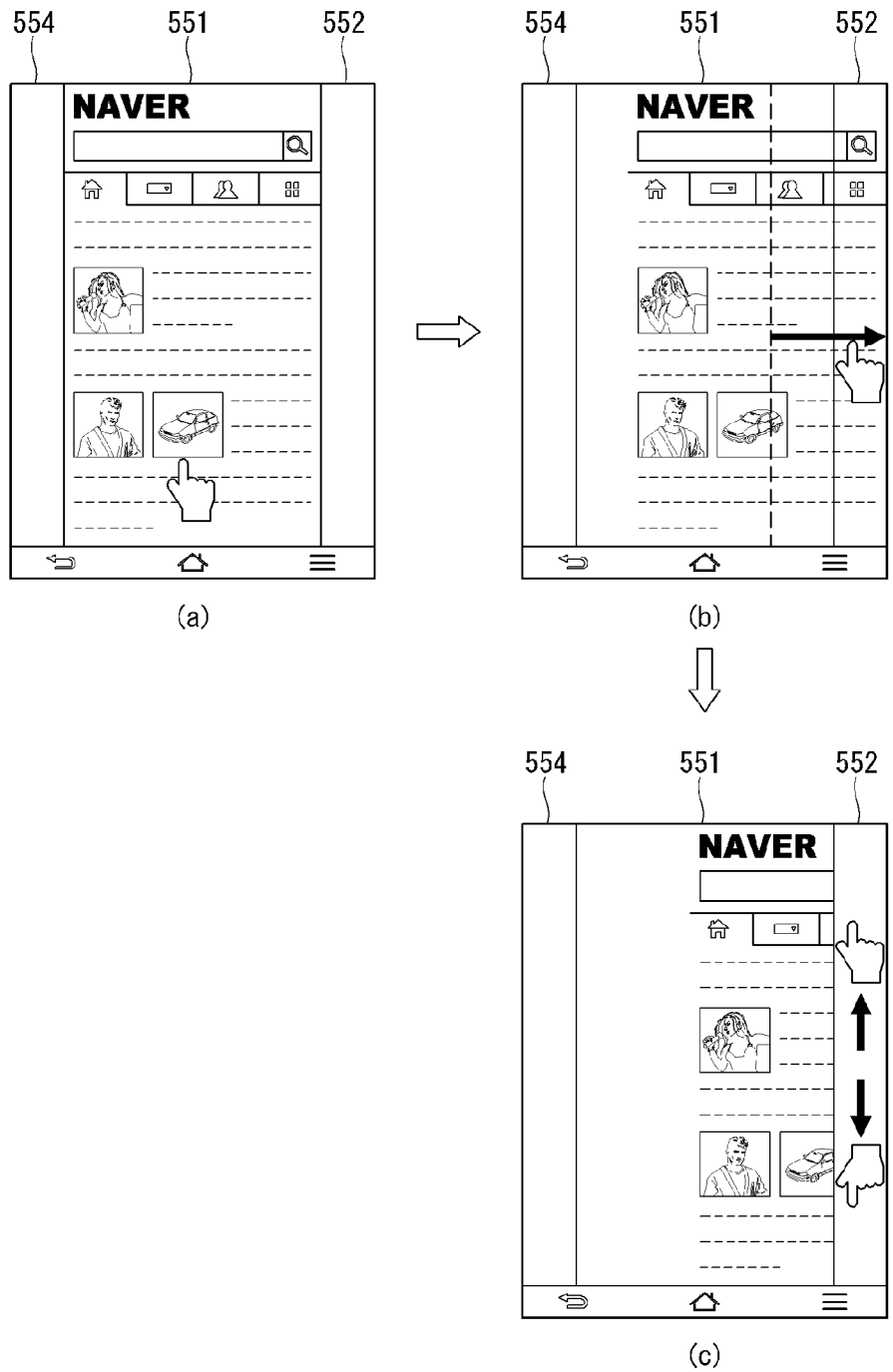
FIG. 16 illustrates another example of carrying out an editing function for an image displayed on a front surface display area according to the method for operating a mobile terminal of FIG. 12.

FIG. 16 illustrates another example of carrying out an editing function for an image displayed on a front surface display area according to the method for operating a mobile terminal of FIG. 12.

FIG. 16(a) illustrates a case where the user touches a particular website screen displayed on the front surface display area 551 for more than a predetermined time period. Then the controller 180 captures the website screen and as shown in FIG. 16(b), displays the capture image of the website screen on the front surface display area 551.

FIG. 16(b) illustrates a case where the user selects a capture image of the website screen by applying a touch input on the front surface display area 551 while the capture image of the website screen is being displayed on the front surface display area 551 and drags the image beyond the front surface display area 551 into the side surface display area 552.

Then the controller 180 displays part of the captured image of the website screen which has been dragged beyond the front surface display area 551 on the side surface display area 552 and activates an editing function for the captured image of the website screen.

FIG. 16(c) illustrates a case where an operation for carrying out a deleting function for the part of the captured image of the website screen dragged beyond the side surface display area 552 is carried out. More specifically, FIG. 16(c) illustrates a case where the user applies a touch motion rubbing the side surface display area 552 up and down and deletes the part of the captured image of the website screen dragged beyond the side surface display area 552.

Figure 17:
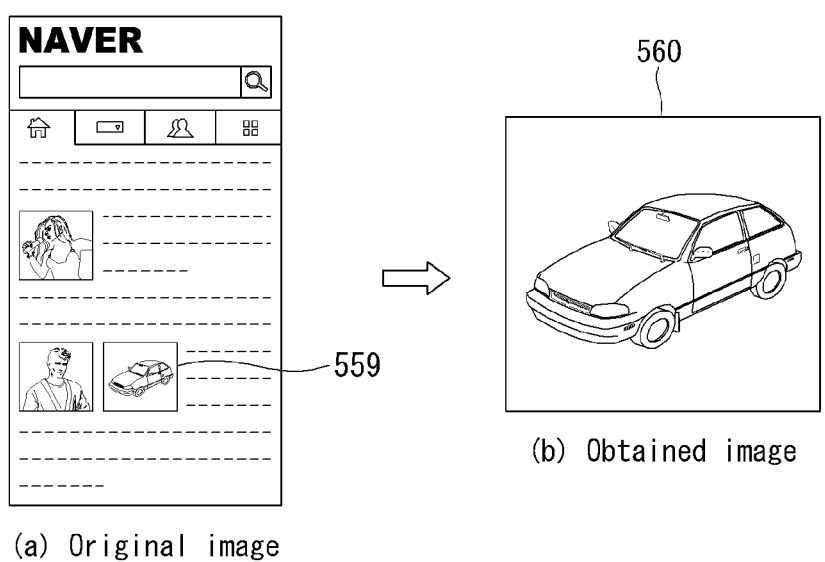
FIG. 17 shows an original image edited according to an image editing process of FIG. 16 and an image obtained as an editing result.

FIG. 17 shows an original image edited according to an image editing process of FIG. 16 and an image obtained as an editing result. The original image of FIG. 17(*a*) shows a captured image of a particular webpage.

One illustrative process of creating the image 600 is as follows. First of all, the user moves the original image toward the side surface display area 552 and deletes the part in the right side of the image 559 that the user wants to extract from the original image. Then by rotating the image of which the right part has been deleted, the user deletes an upper part, left part, and lower part of the image 559 one after another, thereby obtaining the image 560.

The following describe a different example where the image 600 is created in case side surface display areas are disposed in the left and right side and in the upper and lower part of the front surface display area 551. The user drags the original image to the side surface display area in the right side, deletes the part in the right side of the image 559 from the original image, drags the original image to the side surface display area in the left side, deletes the part in the left side of the image 559 from the original image, drags the original image to the side surface display area in the upper side, deletes the part in the upper side of the image 559, drags the original image to the side surface display area in the lower side, and deletes the part in the lower side of the image 559, thereby finally obtaining the image 560.

Figure 18:
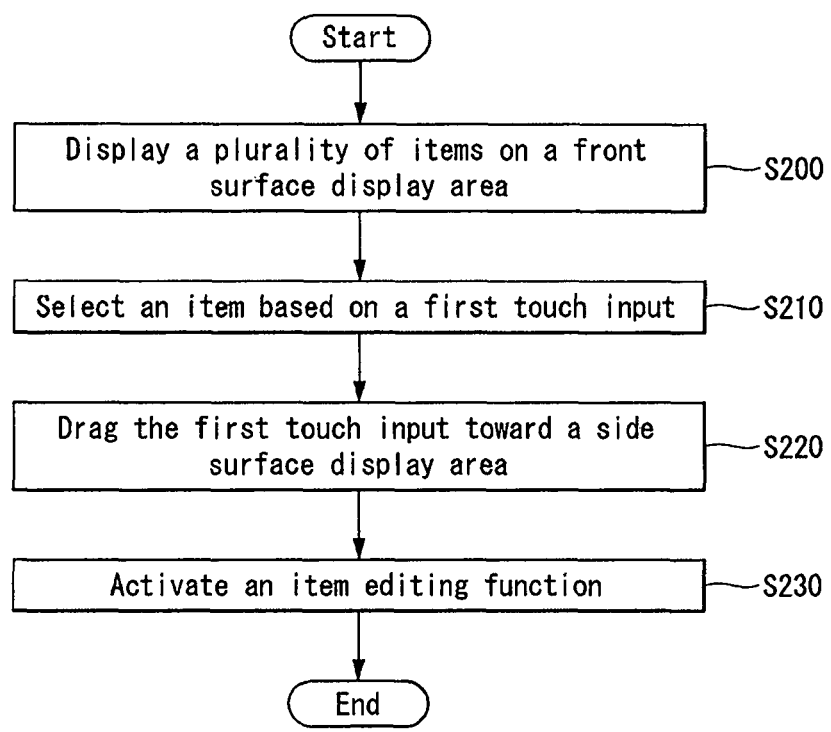
FIG. 18 is a flow diagram illustrating another example of a method for operating a mobile terminal according to the present invention.

FIG. 18 is a flow diagram illustrating another example of a method for operating a mobile terminal according to the present invention. In what follows, the method for operating a mobile terminal will be described with reference to related drawings.

Multiple items are displayed on the front surface display area S200. The multiple items may comprise application execution icons or widgets corresponding to the application execution icons and applications. At this time, the front surface display area may carry out the role of displaying a background screen. And the front surface display area may comprise thumbnail images corresponding to a plurality of image files. At this time, the front surface display area may be in the middle of carrying out the role of displaying an execution screen of an image view application. However, it should be noted that composition of the multiple items is not limited to the aforementioned examples.

If a first touch input is received through the front surface display area while the multiple items are displayed on the front surface display area, the controller 180 selects one of the multiple items based on the received first touch input S210.

If the first touch input is being dragged into the side surface display area after an item is selected based on the first touch input S220, the controller 180 activates an item editing function with respect to the multiple items displayed on the front surface display area S230. At this time, the selected item can be an editing object. Meanwhile, an item editing function can include a deleting function for a simple item, an item disposition change function, an item size change function, and an item property change function. However, the technical scope of the present invention is not limited to the above example.

The item editing function can be kept to be active even if the item editing function is activated, another item is selected from among the multiple items by a touch input, and the touch input is dragged into the side surface display area And if a touch input for selecting an item is dragged into the side surface display area, the controller 180 can display a thumbnail image of the item corresponding to the dragged touch input on the side surface display area. Then by watching a thumbnail image of the item displayed on the side surface display area, the user can visually identify the item which is an editing object.

Figure 19:
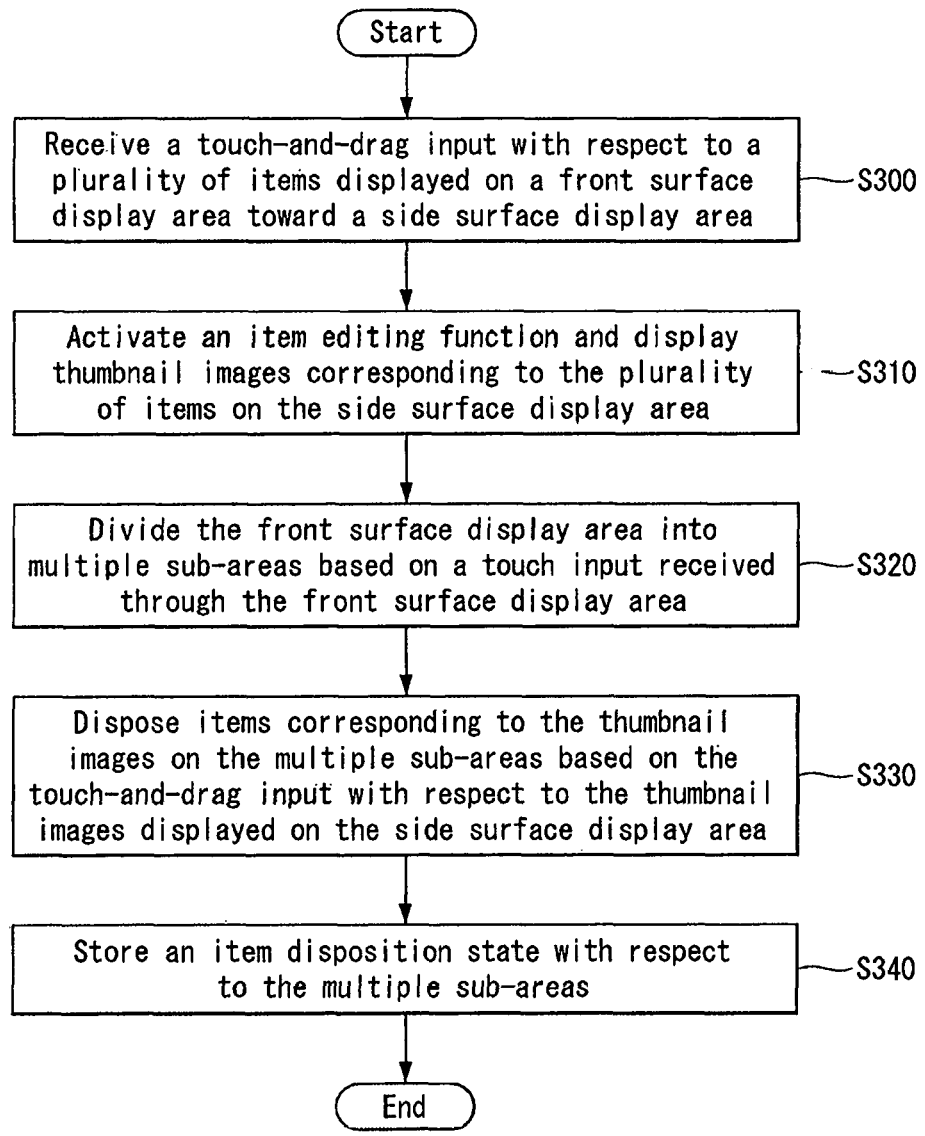
FIG. 19 is a flow diagram illustrating a yet another example of a method for operating a mobile terminal according to the present invention.

FIG. 19 is a flow diagram illustrating a yet another example of a method for operating a mobile terminal according to the present invention. In what follows, the method for operating a mobile terminal will be described with reference to related drawings. It should be noted that the method for operating a mobile terminal can be one example of the method for operating a mobile terminal of FIG. 16.

While multiple items are displayed on the front surface display area of the mobile terminal, a dragging touch input toward the side surface display area with respect to the multiple items is received S300. Then the controller 180 activates an item editing function and displays thumbnail images corresponding to the multiple items on the side surface display area S310. Display of thumbnail images on the side surface display area can indicate that an item corresponding to a thumbnail image has become an editing object.

And the controller 180 divides the front surface display area into multiple sub-areas based on a touch input received through the front surface display area S320. At this time, the controller 180 can display guidelines for visually distinguishing the multiple sub-areas from one another on the front surface display area.

While the front surface display area is divided into multiple sub-areas, a thumbnail image displayed on the side surface display area is touched and dragged into one of the multiple sub-areas, the controller 180 disposes an item corresponding to the dragged thumbnail image on the corresponding sub-area S330. At this time, the controller 180 can change the size of a disposed item so that it can fit into the size of a sub-area into which the thumbnail image has been dragged. And according to the embodiment of the present invention, the controller may change the properties of an item corresponding to a thumbnail image displayed on the sub-area into which the thumbnail image has been dragged based on the size of the sub-area.

If a storage command is received after items corresponding to the thumbnail images are disposed on the multiple sub-areas based on a dragged touch input with respect to the thumbnail images displayed on the side surface display area, the controller 180 stores an item disposition state with respect to the multiple sub-areas S340.

Figure 20:
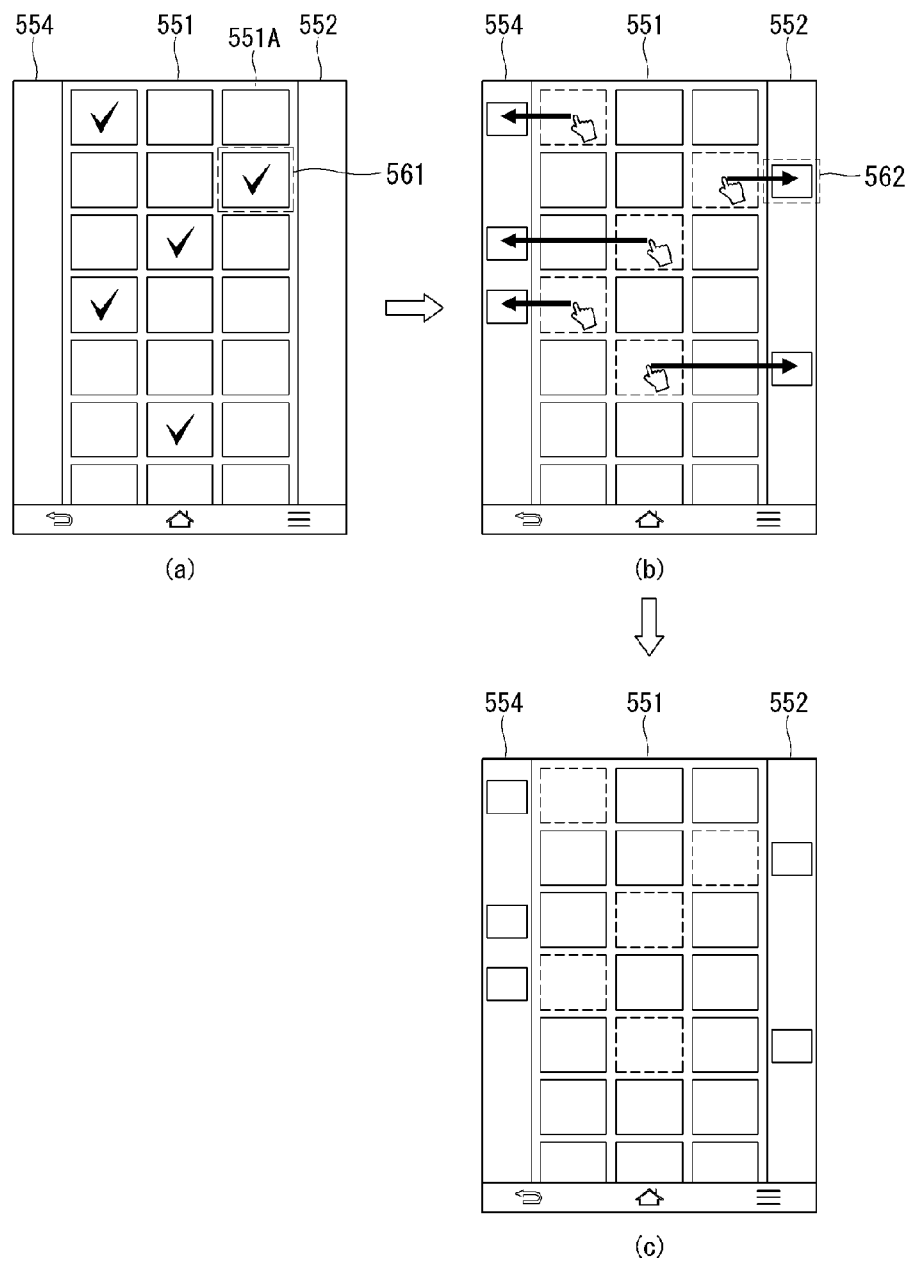
FIGS. 20 to 22 illustrate examples where an item editing function is carried out according to the method for operating a mobile terminal of FIG. 19.
Figure 21:
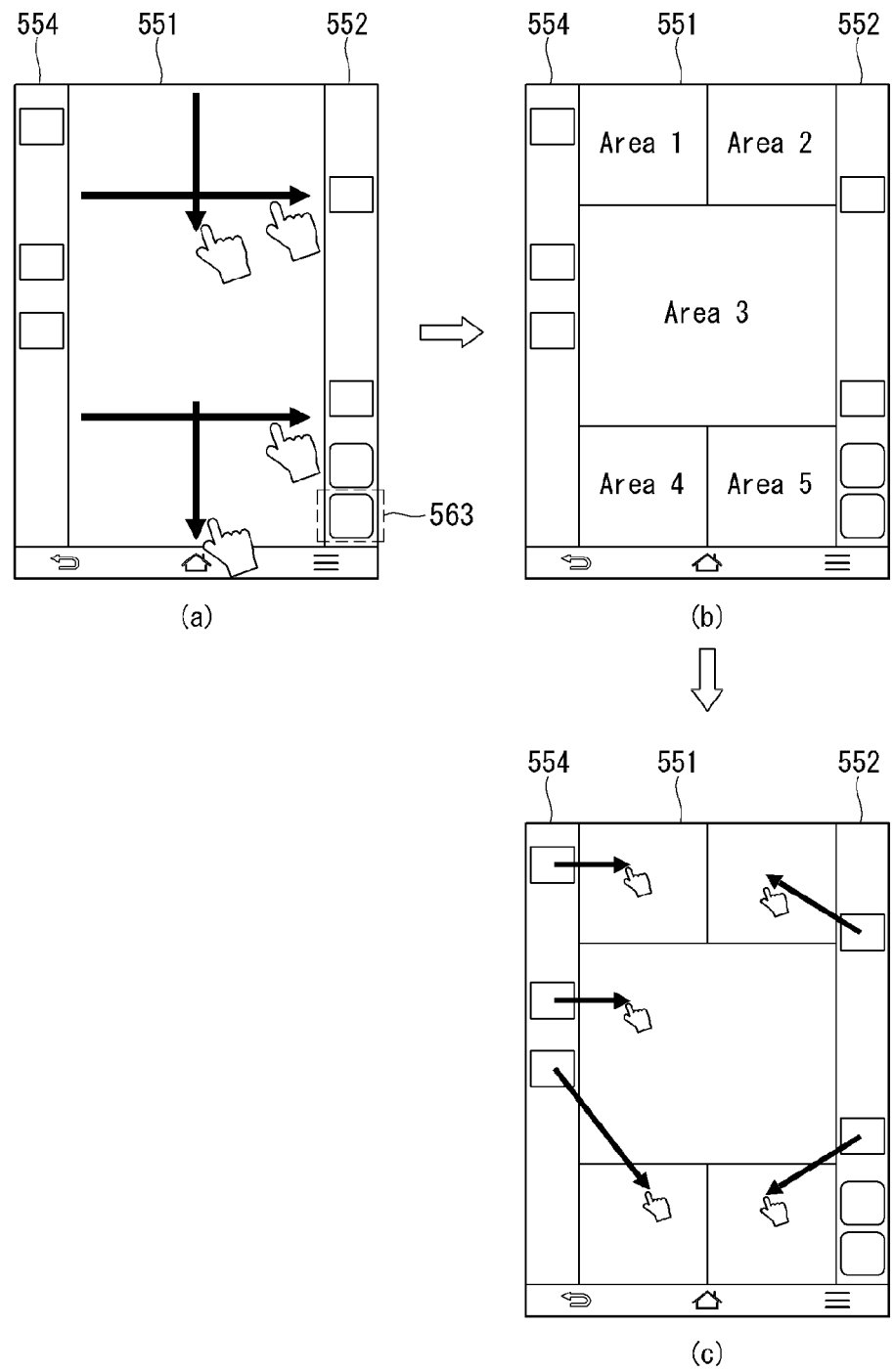
Figure 22:
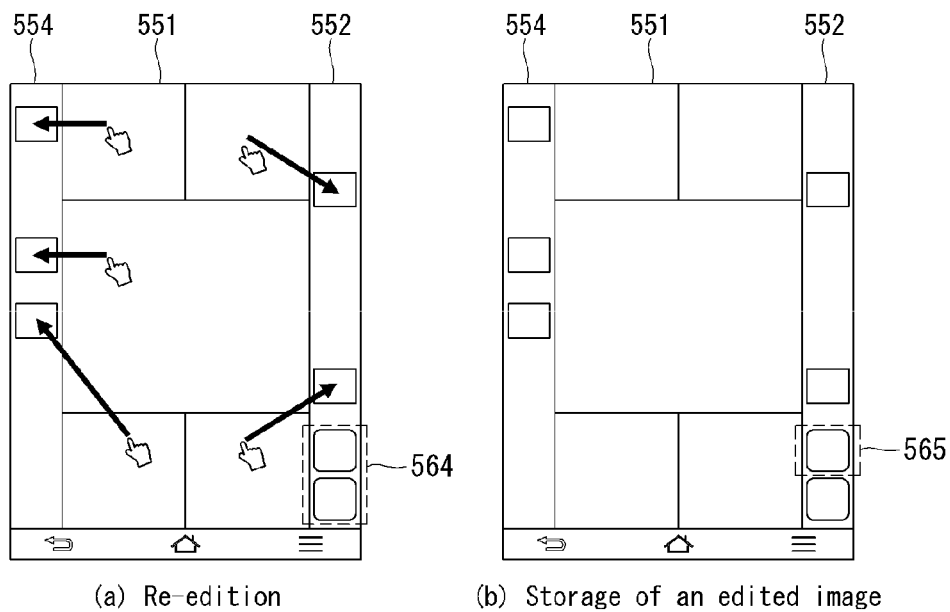

FIGS. 20 to 22 illustrate examples where an item editing function is carried out according to the method for operating a mobile terminal of FIG. 19.

FIG. 20(*a*) illustrates a case where an image object 561 corresponding to a plurality of image files is displayed on the front surface display area 551. The image object may correspond to a thumbnail image representing an image file or an execution result of the image file. The user can select the screen indicated by a 'V' mark from among a plurality of image objects 561 of FIG. 20(*a*) through his or her touch motion. Selection of an image object can be carried out by a touch operation such as a long touch input or a double tab input. Meanwhile, the display screen of the front surface display area 551 can be an execution screen of an image view application.

FIG. 20(*b*) illustrates a case where the user drags the selected image objects toward the side surface display areas 552, 554 disposed in both sides of the front surface display area 551. Then as shown in FIG. 20(*b*), the controller 180 displays thumbnail images 562 corresponding to the selected image objects on the side surface display areas 552 and 554.

FIG. 20(*c*) illustrates a case where the user carries out a touch operation for deleting image objects displayed on the front surface display area 551 while the thumbnail images 562 are displayed on the side surface display areas 552, 554.

As shown in FIG. 20(*c*), the touch operation can be a touch motion of rubbing the front surface display area 551 with a finger similarly to a rubbing motion with an eraser. However, the touch motion for deleting an image object displayed on the front surface display area 551 is not limited to the example above. For example, a touch motion for deleting an image object displayed on the front surface display area 551 may be a touch motion such as a long touch input or a double tab input on the front surface display area 551 or on the side surface display areas 552, 554.

FIG. 21(*a*) illustrates a case where the user carries out a touch operation for dividing the front surface display area 551 into multiple sub-areas after deleting image objects displayed on the front surface display area 551 by using the touch motion of FIG. 20(*c*). Then as shown in FIG. 20(*b*), the controller 180 can divide the front surface display area 551 into multiple sub-areas (Area 1 to Area 5).

However, depending on implementation case of the present invention, the front surface display area 551 may be directly subdivided into multiple areas based on a touch motion for distinguishing sub-areas as illustrated in FIG. 21(*a*) by skipping deletion of image objects as in FIG. 20(*c*). Meanwhile, in case an icon 563 for area segmentation is selected from a graphic user interface provided through the side surface display area 552 as shown in FIG. 21(*a*), the controller 180 may subdivide the front surface display area 551 into multiple areas based on a touch input received through the front surface display area 551.

FIG. 21(*c*) illustrates a case where touch inputs on the thumbnail images 562 displayed on the side surface display areas 552, 554 are dragged into the respective sub-areas. Then the controller 180 displays an item corresponding to a dragged thumbnail image in proportion to the size of the corresponding area. At this time, the controller 180 can change the size of the corresponding item based on the size of the sub-area into which the corresponding thumbnail image is dragged.

FIG. 22(*a*) illustrates a case where a plurality of items are disposed on the front surface display area 551 and based on a touch-and-drag motion with respect to the disposed items, thumbnails images corresponding to the items are displayed again on the side surface display areas 552, 554. In other words, the mobile terminal provides a re-editing function for rearranging items disposed on multiple sub-areas. The graphic user interface 564 displayed on the side surface display area 552 of FIG. 22(*a*) can include icons for carrying out various functions required for an item editing function.

FIG. 22(*b*) illustrates a case where items are rearranged across the multiple sub-areas of the front surface display area 551 and the user stores an item disposition state by selecting a storage icon 565 provided through the side surface display area 552. At this time, in case disposed items correspond to image files, a new image file combining multiple image files can be created based on execution of the storage function.

Figure 23:
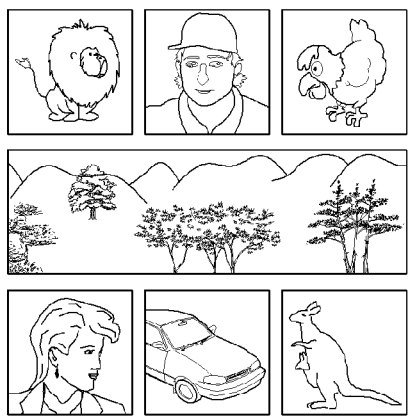
FIG. 23 shows examples of creating a new image file based on the image editing method illustrated in FIGS. 20 to 22.
Figure 23:
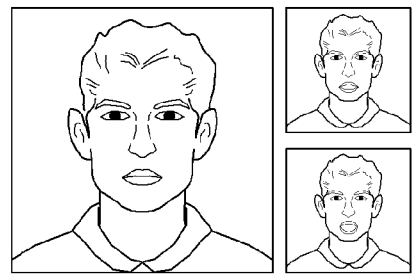

FIG. 23 shows examples of creating a new image file based on the image editing method illustrated in FIGS. 20 to 22.

FIG. 23(*a*) illustrates a case where the front surface display area of a mobile terminal according to the present invention is subdivided into seven areas, image files are disposed to the respective seven areas, a storage function is carried out, and a new image file combining the seven image files is created.

FIG. 23(*b*) illustrates a case where the front surface display area of a mobile terminal according to the present invention is subdivided into three areas, image files are disposed to the respective three areas, a storage function is carried out, and a new image file combining the three image files is created.

Figure 24:
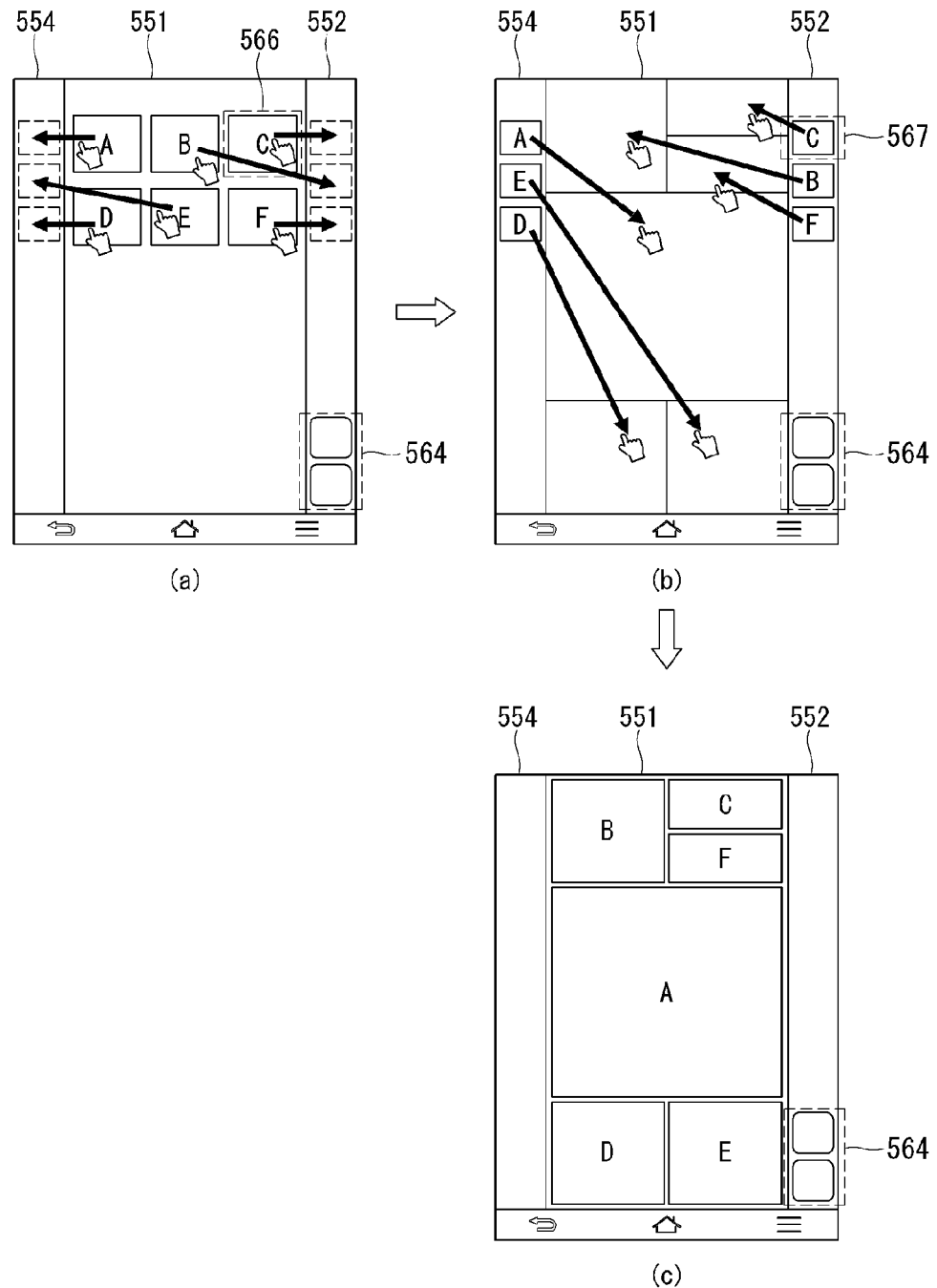
FIG. 24 illustrates another example of carrying out an item editing function according to the method for operating a mobile terminal of FIG. 19.

FIG. 24 illustrates another example of carrying out an item editing function according to the method for operating a mobile terminal of FIG. 19.

FIG. 24(*a*) is one of execution screens of an image gallery application and illustrates a case where an item editing function (namely, a folder size change function) is activated while image objects 566 corresponding to six folders are displayed on the front surface display area 551. And FIG. 24(*a*) further illustrates a case where image objects 566 corresponding to the folders are selected by a touch input and dragged toward the side surface display areas 552, 554.

Then as shown in FIG. 24(*b*), thumbnail images 567 corresponding to the folders are displayed on the side surface display areas 552, 554. And the front surface display area 551 is subdivided into multiple sub-areas. The subdivision can be configured by the user's touch input received through the front surface display area 551 as illustrated in FIG. 21(*a*). While in the disposition of FIG. 24(*b*), the respective thumbnail images 567 displayed on the side surface display areas 552, 554 are touched and dragged into the corresponding sub-areas.

Then as shown in FIG. 24(*c*), the controller 180 displays image objects of folders corresponding to the dragged thumbnail images on the front surface display area 551. At this time, as shown in FIG. 24(*c*), the controller 180 can change the size of the image object of the folder based on the size of the corresponding area.

Figure 25:
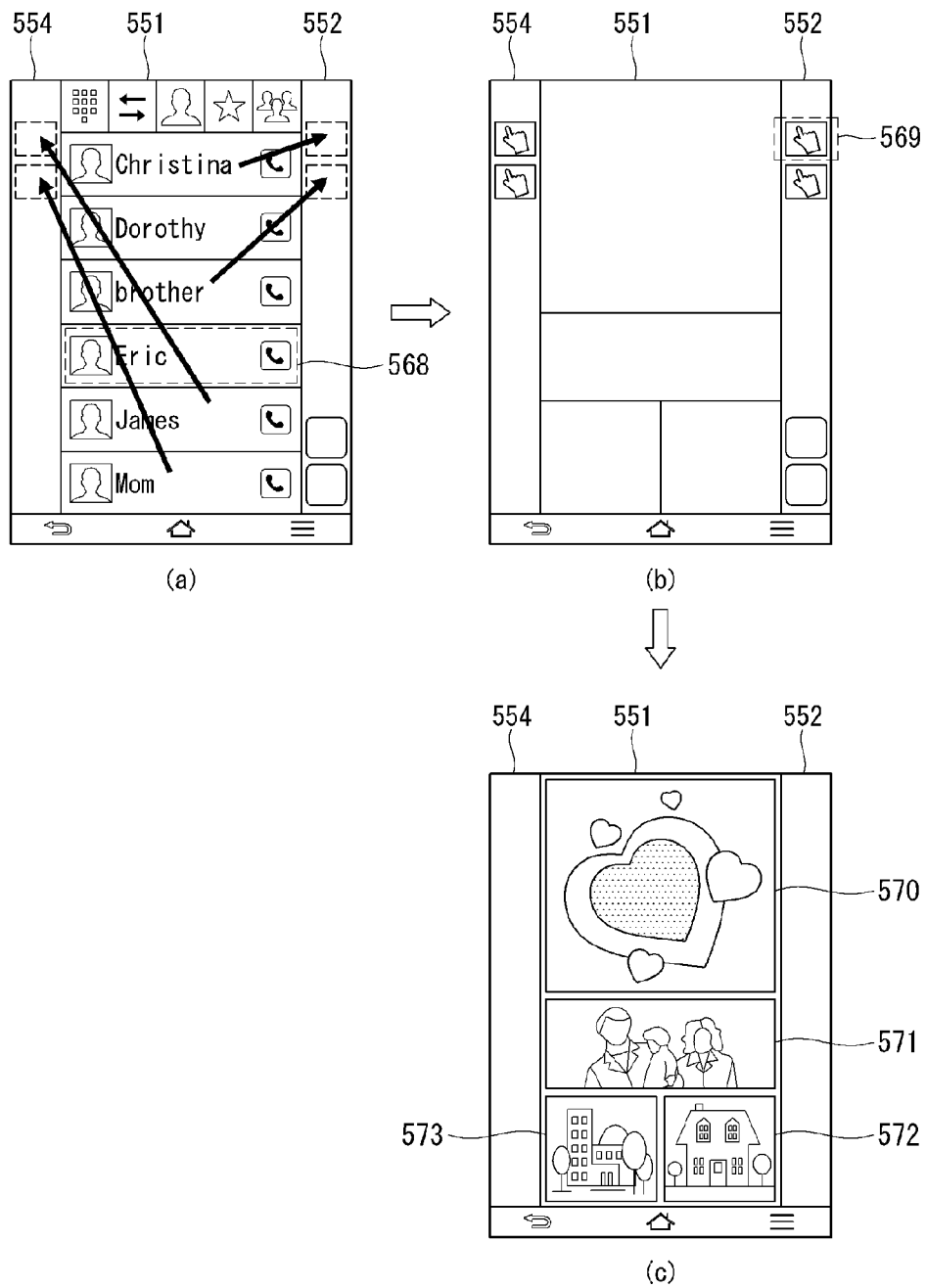
FIG. 25 illustrates a yet another example of carrying out an item editing function according to the method for operating a mobile terminal of FIG. 19.

FIG. 25 illustrates a yet another example of carrying out an item editing function according to the method for operating a mobile terminal of FIG. 19.

FIG. 25(*a*) illustrates a case where an image editing function is activated in an execution screen of a contact managing application showing a plurality of contact items 568 in a buddy list. And FIG. 25(*a*) further illustrates a case where contact items are selected by a touch input and dragged into the side surface display areas 552, 554.

Then, as shown in FIG. 25(*b*), the controller 180 displays thumbnail images 569 corresponding to the contact items on the side surface display areas 552, 554. And the front surface display area 551 is subdivided into multiple areas. As illustrated in FIG. 21(*a*), the subdivision can be carried out based on the user's touch input received through the front surface display area 551. And while in the disposition of FIG. 25(*b*), the user touches and drags individual thumbnail images 567 displayed on the side surface display areas 552, 554 into the corresponding sub-areas.

Then, as shown in FIG. 25(*c*), the controller 180 displays an image object of a contact item corresponding to the dragged thumbnail image on the front surface display area 551. At this time, as shown in FIG. 24(*c*), the size of the image object corresponding to the contact item can be changed based on the size of the corresponding area.

And as shown in FIG. 25(*c*), the controller 180 can change the image object of the contact item into another image object corresponding to the contact item. For example, a heart-shaped image object 570 from among the image objects can be pre-assigned for those contact items classified as a group of loved ones. A family photo 571 may be an image object pre-assigned to those contact items classified as family members. And an image object 572 of a building may represent a person of the corresponding contact item, who works in the building.

Figure 26:
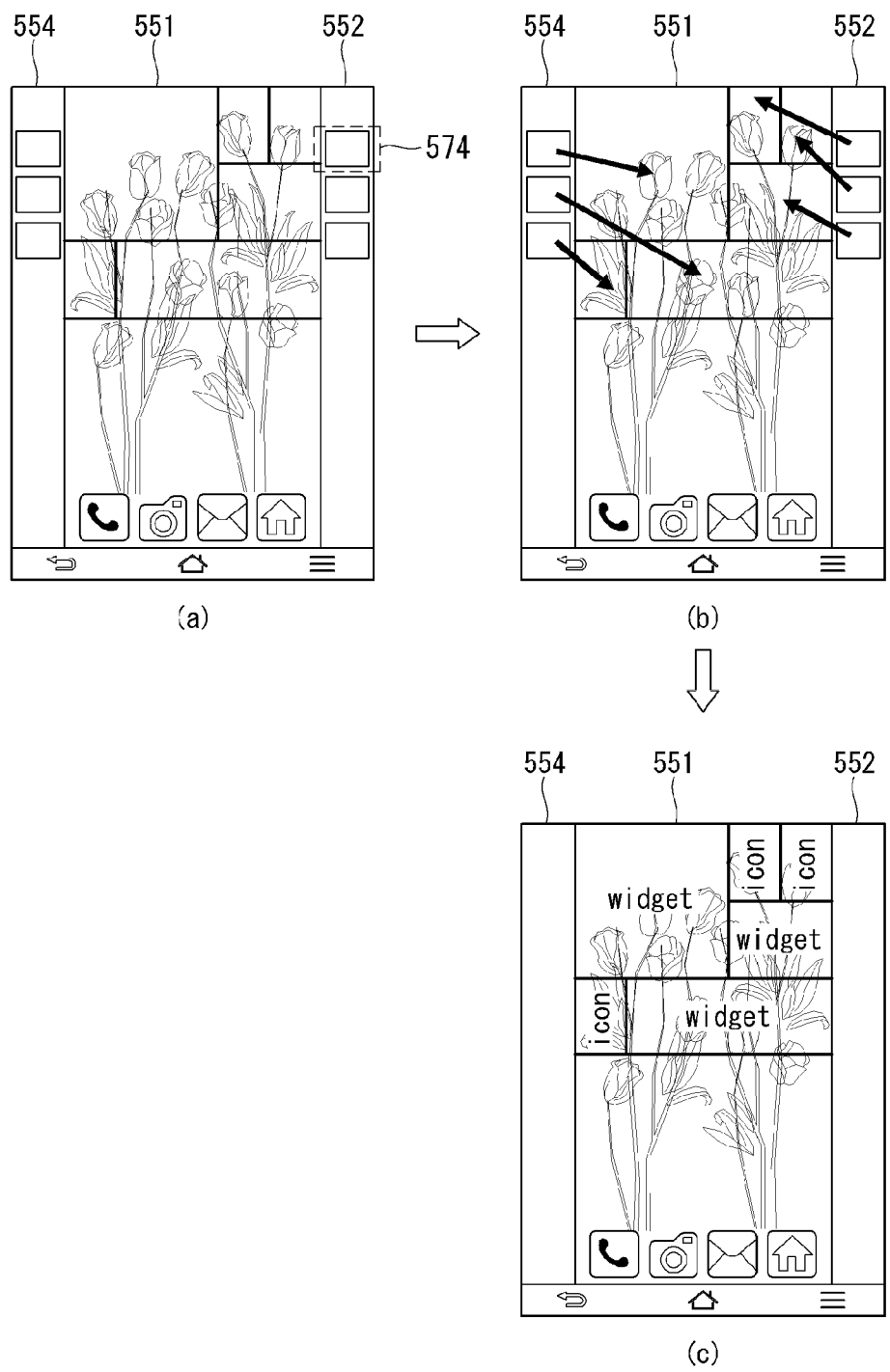
FIG. 26 illustrates a still another example of carrying out an item editing function according to the method for operating a mobile terminal of FIG. 19.

FIG. 26 illustrates a still another example of carrying out an item editing function according to the method for operating a mobile terminal of FIG. 19.

FIG. 26(*a*) illustrates a case where an image editing function is activated in a background screen displaying a plurality of icons. FIG. 26(*a*) further illustrates a case where icons are selected by a touch input and dragged into the side surface display areas 552, 554, and thumbnail images 574 corresponding to the icons are displayed on the side surface display areas 552, 554.

And FIG. 26(*b*) illustrates a case where the front surface display area 551 is subdivided into multiple sub-areas. As illustrated in FIG. 21(*a*), the subdivision can be carried out based on the user's touch input received through the front surface display area 551. And while in the disposition of FIG. 26(*b*), the user touches and drags individual thumbnail images 573 displayed on the side surface display areas 552, 554 into the corresponding sub-areas.

Then, as shown in FIG. 26(*c*), the controller 180 displays images objects (icons or widgets) corresponding to the dragged thumbnail images on the front surface display area 551. At this time, as shown in FIG. 26(*c*), the controller 180 can change the size of the image object displayed on the corresponding sub-area based on the size thereof.

Meanwhile, in case the sub-area into which a thumbnail image has been dragged is larger than a predetermined size, the controller 180 display a widget corresponding to the application rather than an execution icon of the application on the sub-area. On the other hand, in case an item displayed on the original background screen is a widget of a particular application and the size of the sub-area into which the corresponding thumbnail has been dragged is smaller than a predetermined size, the controller may display an execution icon of the particular application rather than a widget of the particular application on the sub-area. In other words, the controller 180 can change the very property of an item displayed on the sub-area into which the corresponding thumbnail image has been dragged based on the size of the sub-area.

Figure 27:
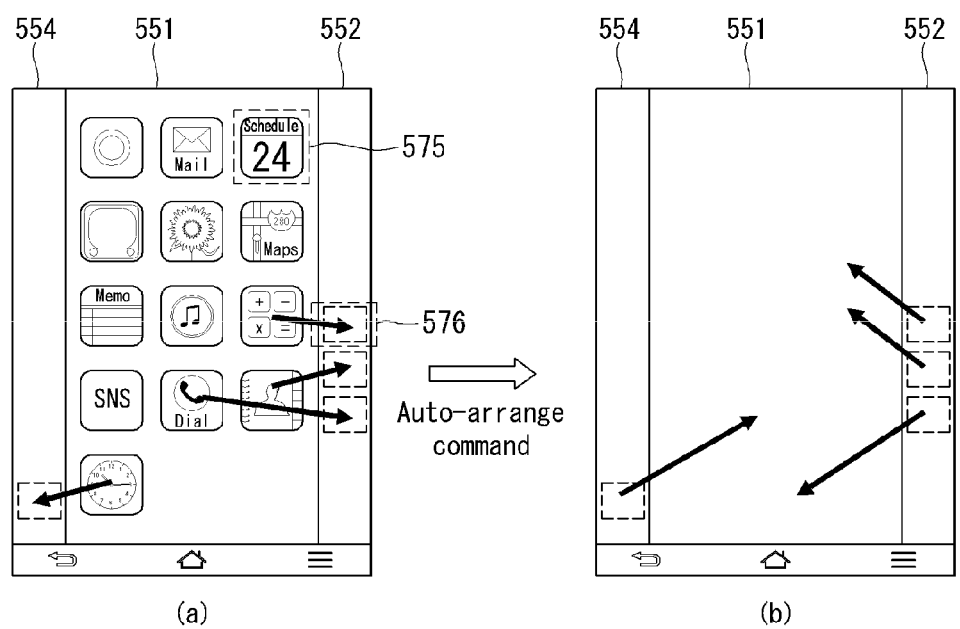
FIG. 27 illustrates another example of an item editing method carried out in a mobile terminal according to the present invention.

FIG. 27 illustrates another example of an item editing method carried out in a mobile terminal according to the present invention.

FIG. 27(*a*) illustrates a case where a plurality of items 575 including execution icons of applications and folder icons are displayed on the front surface display area 551, and the user selects items by applying a touch input and drags the touch input toward the side surface display areas 552, 554. Then the controller 180 displays a thumbnail image 576 corresponding to the selected item on the side surface display areas 552, 554.

As shown in FIG. 27(*b*), if an auto-arrange command is received in the arrangement of FIG. 27(*a*), the controller 180 creates a new background screen and automatically arranges the items corresponding to the thumbnail images displayed in the side surface display areas 552, 554 on the new background screen of the front surface display area 551.

Meanwhile, according to another implementation case of the present invention, as shown in FIG. 21(*a*), in case the front surface display area 551 is subdivided into sub-areas in the arrangement of FIG. 27(*a*) through the user's touch motion and an auto-arrange command is received, the controller 180 may automatically re-arrange the items corresponding to thumbnail images into the sub-areas.

Figure 28:
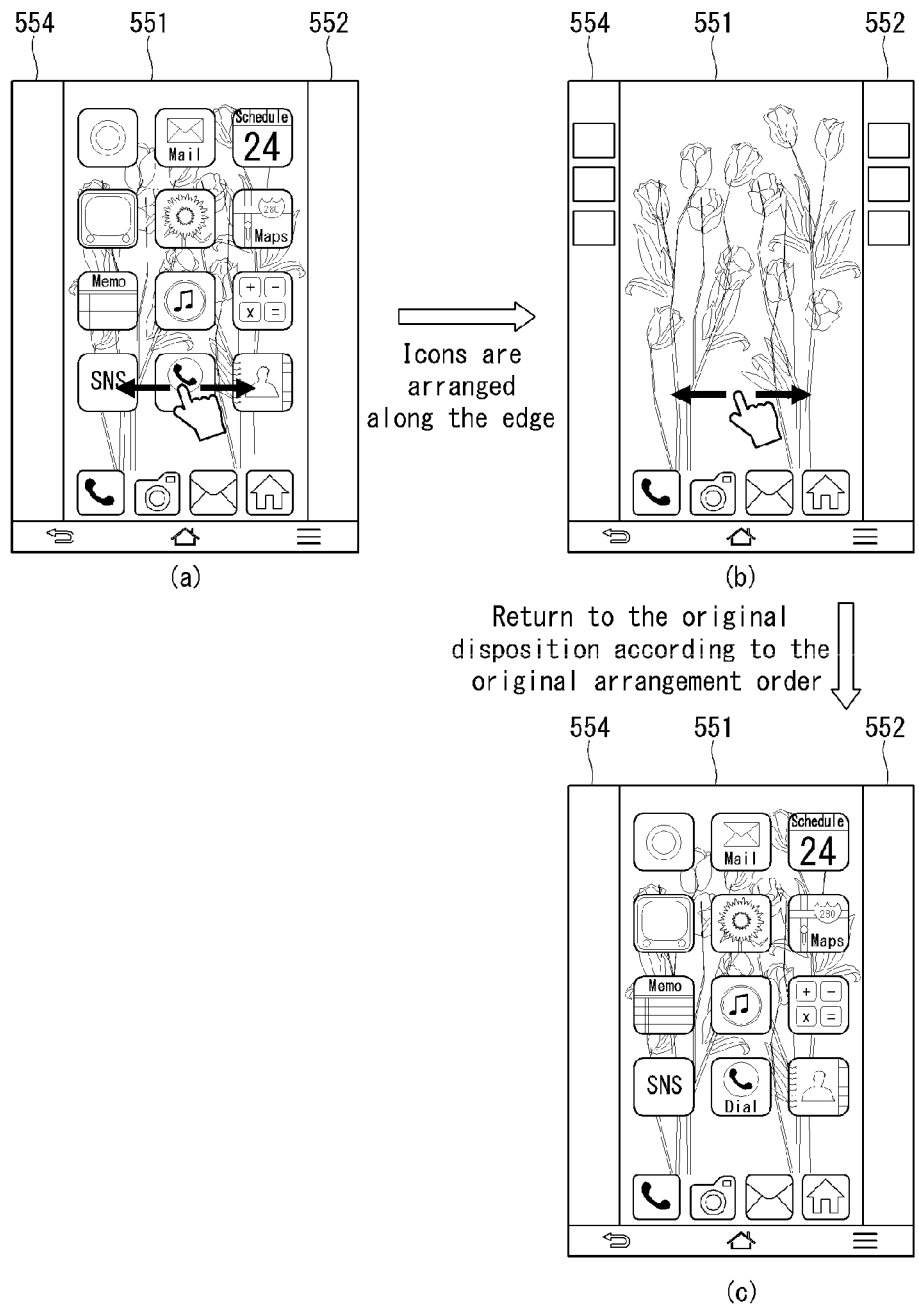
FIG. 28 illustrates a yet another example of an item editing method carried out in a mobile terminal according to the present invention.

FIG. 28 illustrates a yet another example of an item editing method carried out in a mobile terminal according to the present invention.

FIG. 28(*a*) illustrates a case where the user repeats a touch motion moving from side to side through the front surface display area 551 while a background screen including a plurality of items is displayed on the front surface display area 551. Then, as shown in FIG. 28(*b*), the controller 180 displays thumbnail images corresponding to the items displayed on the front surface display area 551 on the side surface display areas 552, 554 based on the touch motion.

While the thumbnail images being displayed on the side surface display areas 552, 554, the user again repeats a touch motion moving from side to side through the front surface display area 551. As shown in FIG. 28(*c*), the controller 180 recovers the original background screen and deletes thumbnail images displayed on the side surface display areas 552, 554.

Figure 29:
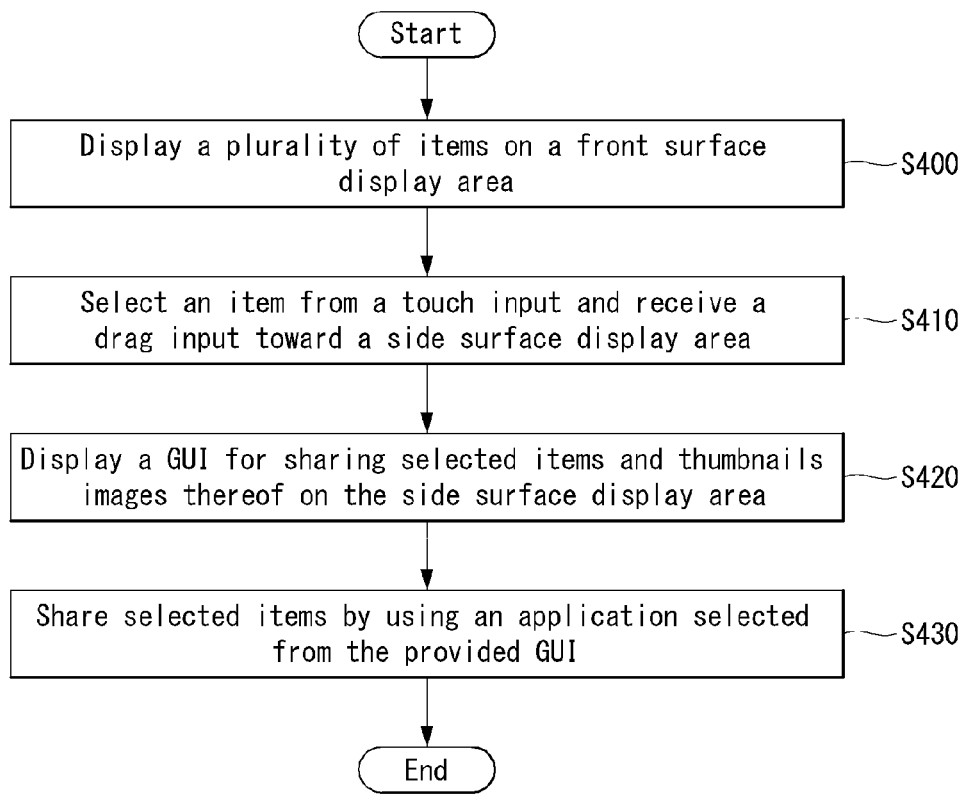
FIG. 29 is a flow diagram illustrating a still another example of a method for operating a mobile terminal according to the present invention.

FIG. 29 is a flow diagram illustrating a still another example of a method for operating a mobile terminal according to the present invention. In what follows, the method for operating a mobile terminal will be described with reference to related drawings.

While a plurality of items are displayed on the front surface display area 551, S400, an item is selected through a touch input and the touch input is dragged toward the side surface display area S410. The touch-and-drag motion can be carried out with respect to various items.

Then the controller 180 displays a thumbnail image of a selected item on the side surface display area and displays a graphic user interface for sharing the selected item on the side surface display area S420. The graphic user interface can include icons for selecting an application to carry out a function of sharing a selected item. Applications for this purpose may include various types of SNS applications, message writing applications, e-mail writing applications, item sharing applications employing short-range wireless communication such as Bluetooth or WiFi. However, the technical scope of the present invention is not limited to the examples above.

And if an icon for carrying out a function for sharing an item selected from the graphic user interface is selected, the controller 180 carries out a function for sharing the selected item by using a selected application S430.

Figure 30:
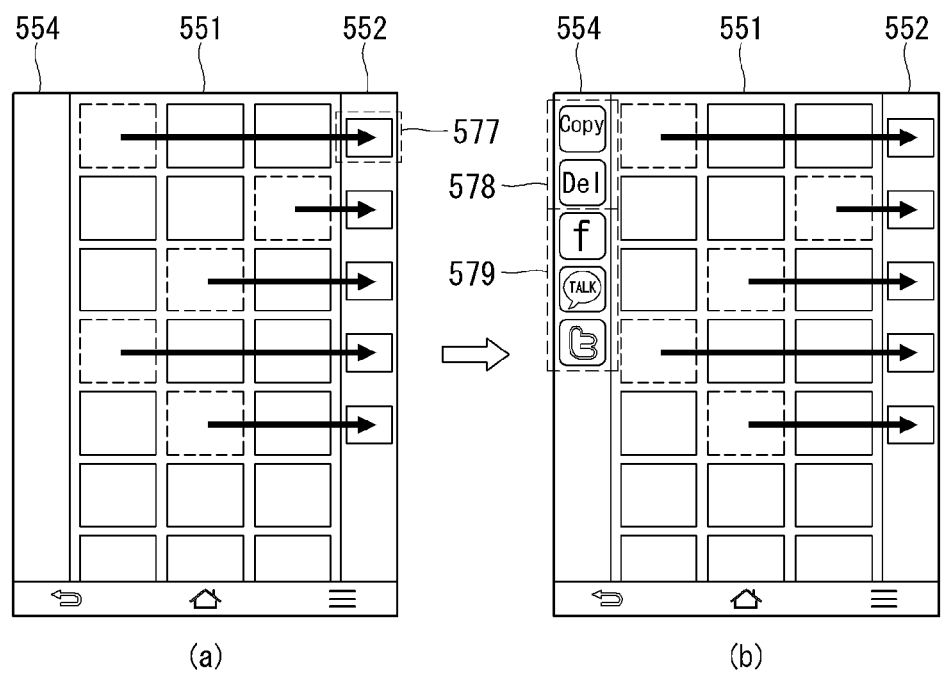
FIG. 30 illustrates an example of carrying out a function of editing an item displayed on a front surface display area according to the method for operating a mobile terminal of FIG. 29.

FIG. 30 illustrates an example of carrying out a function of editing an item displayed on a front surface display area 551 according to the method for operating a mobile terminal of FIG. 29.

FIG. 30(*a*) illustrates a case where a plurality of items displayed on the front surface display area 551 are selected by a touch input and dragged into the side surface display area 552. Then the controller 180 displays thumbnail images 577 of selected items on the side surface display area 552 based on the dragging touch input and displays a graphic user interface 578 for selecting an application for sharing the selected items on the other side surface display area 554. Then the user can carry out a function for sharing the selected items by selecting an icon of an application with which to carry out a sharing function from the graphic user interface 578.

Meanwhile, as shown in FIG. 30(*b*), the controller 180 may provide a graphic user interface 579, which is intended for carrying out a function of deleting or copying an item selected based on the touch-and-drag motion, through the other side surface display area 554.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal, comprising:
   a display configured to embed a touch screen function and to include a front surface display area and a side surface display area; and
   a controller configured to:
   select an item based on a first touch input received through the front surface display area displaying a plurality of items,
   activate an item editing function in the front surface display area in response to the first touch input being dragged toward the side surface display area,
   display a thumbnail image corresponding to the selected item on the side surface display area based on the dragging of the first touch input toward the side surface display area,
   when all items on the front surface display area are dragged to the side surface display area such that the front surface display area is absent any items, subdivide the front surface display area into multiple sub-areas based on at least one second touch input received through the front surface display area, and
   dispose an item corresponding to the selected thumbnail image on one sub-area of the multiple sub-areas, if the thumbnail image is selected by a third touch input and the third touch input is dragged into the one sub-area,
   wherein the at least one second touch input includes a vertical touch input and a horizontal touch input crossing the vertical touch input,
   wherein the front surface display area is divided into a first sub-area, a second sub-area and a third sub-area defined by the vertical touch input and the horizontal touch input, and
   wherein the one sub-area including the item includes one of the first sub-area, the second sub-area and the third sub-area.

2. The mobile terminal of claim 1, wherein the controller is configured to change size of an item corresponding to the selected thumbnail image disposed on the one sub-area to be proportional to the one sub-area.

3. The mobile terminal of claim 2, wherein the plurality of items are image objects representing a plurality of image files, and
   if image objects corresponding to image files are disposed respectively to two or more areas from among the multiple sub-areas and a storage command is received, the controller is configured to create and store a new image file in a form of combining image files corresponding to the two or more sub-areas.

4. The mobile terminal of claim 2, wherein the controller is configured to change properties of an item corresponding to the selected thumbnail image displayed on the one sub-area based on size of the one sub-area.

5. The mobile terminal of claim 2, wherein, in case the selected item is an execution icon of a particular application and size of the at least one sub-area is larger than a predetermined size, the controller is configured to change an item corresponding to the selected thumbnail image to a widget corresponding to the particular application and to display the widget corresponding to the particular application on the one sub-area.

6. The mobile terminal of claim 5, wherein, in case the selected item is a widget corresponding to a particular application and size of the changed image object is smaller than a predetermined size, the controller is configured to change an item corresponding to the selected thumbnail image from a widget corresponding to the particular application to an execution icon of the particular application and to display the execution icon of the particular application on the one sub-area.

7. The mobile terminal of claim 1, wherein, if the first touch input with respect to each of two or more items from among the plurality of items is dragged toward the side surface display area, the controller is configured to display thumbnail images corresponding to the two or more items on the side surface display area, to create a new background screen based on an auto-arrange command, and to automatically arrange the two or more items on the new background screen.

8. The mobile terminal of claim 7, wherein the controller is configured to subdivide the front surface display area into the multiple sub-areas based on at least a fourth touch input received through the front surface display area and to create the automatically arranged, new background screen in which the two or more items are automatically arranged respectively in the corresponding sub-areas from among the multiple sub-areas based on the auto-arrange command.

* * * * *